(12) United States Patent
Jiang et al.

(10) Patent No.: US 12,287,119 B2
(45) Date of Patent: Apr. 29, 2025

(54) AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventors: Jingqiang Jiang, Foshan (CN); Zhijun Jin, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 532 days.

(21) Appl. No.: 17/613,411

(22) PCT Filed: Jul. 24, 2019

(86) PCT No.: PCT/CN2019/097482
§ 371 (c)(1),
(2) Date: Nov. 22, 2021

(87) PCT Pub. No.: WO2020/237808
PCT Pub. Date: Dec. 3, 2020

(65) Prior Publication Data
US 2022/0243933 A1    Aug. 4, 2022

(30) Foreign Application Priority Data

May 24, 2019   (CN) .......................... 201910440985.2
May 24, 2019   (CN) .......................... 201920770372.0
(Continued)

(51) Int. Cl.
*F24F 5/00*    (2006.01)
*F24F 13/22*   (2006.01)

(52) U.S. Cl.
CPC .......... *F24F 5/0017* (2013.01); *F24F 13/222* (2013.01)

(58) Field of Classification Search
CPC ........ F24F 5/0017; F24F 13/222; F24F 1/022; F24F 1/04; F24F 13/30; F24F 13/22; F24F 13/02; F24F 2221/125; F24F 5/00
See application file for complete search history.

(56) References Cited

U.S. PATENT DOCUMENTS

2005/0150251 A1 * 7/2005 Navedo et al. ....... F24F 5/0017
                                                          62/530
2008/0022713 A1 * 1/2008 Jacobi ................... F24F 5/0017
                                                          62/434
(Continued)

FOREIGN PATENT DOCUMENTS

CN      201348318 Y      11/2009
CN      202361855 U       8/2012
(Continued)

OTHER PUBLICATIONS

CN 208536214 U Translation (Year: 2019).*
(Continued)

*Primary Examiner* — Elizabeth J Martin
*Assistant Examiner* — Dario Antonio Deleon
(74) *Attorney, Agent, or Firm* — Anova Law Group, PLLC

(57) ABSTRACT

An air conditioner includes a housing, a compressor system provided in the housing and including a first heat exchanger, a second heat exchanger, a compressor, and a throttle device that are circularly communicated, and a liquid pump system provided in the housing and including a third heat exchanger, an energy storage device, and a liquid pump device that are circularly communicated. The liquid pump system contains a coolant circulating in the liquid pump system. The energy storage device includes an energy stor- (Continued)

age medium configured to receive energy from the second heat exchanger and store the energy, and to exchange heat with the coolant.

18 Claims, 20 Drawing Sheets

(30) Foreign Application Priority Data

May 24, 2019 (CN) .......................... 201920770375.4
May 24, 2019 (CN) .......................... 201920775234.1

(56) References Cited

U.S. PATENT DOCUMENTS

| | | | | |
|---|---|---|---|---|
| 2015/0300696 A1* | 10/2015 | Gao | ....................... | F24F 1/022 62/260 |
| 2018/0073769 A1* | 3/2018 | Herweck et al. | ..... | F24F 5/0017 |
| 2018/0195758 A1* | 7/2018 | Hou et al. | ............. | F24F 13/222 |
| 2019/0120563 A1* | 4/2019 | Nguyen et al. | ....... | F28D 9/0056 |
| 2020/0217592 A1* | 7/2020 | Gutzlaff et al. | ........ | F28D 15/02 |
| 2020/0224923 A1* | 7/2020 | Suehiro et al. | ....... | F24F 5/0003 |
| 2020/0399109 A1* | 12/2020 | Park et al. | ........... | B67D 1/0864 |

FOREIGN PATENT DOCUMENTS

| | | | | |
|---|---|---|---|---|
| CN | 105864907 A | | 8/2016 | |
| CN | 106225127 A | * | 12/2016 | ............ F24F 5/0017 |
| CN | 207247390 U | * | 4/2018 | ................ F24F 1/02 |
| CN | 208536214 U | * | 2/2019 | .............. F24F 1/022 |
| CN | 109579197 A | | 4/2019 | |
| CN | 209944646 U | | 1/2020 | |
| DE | 3938875 A1 | | 5/1991 | |
| JP | H07269899 A | | 10/1995 | |
| KR | 20110073764 A | | 6/2011 | |

OTHER PUBLICATIONS

CN 207247390 U Translation (Year: 2018).*
CN 106225127 A Translation (Year: 2016).*
The European Patent Office (EPO) Extended Search Report for EP Application No. 19931451.9 May 20, 2022 7 Pages.
World Intellectual Property Organization (WIPO) International Search Report and Written Opinion for PCT/CN2019/097482 Mar. 2, 2020 19 pages (with translation).
The China National Intellectual Property Administration (CNIPA) The Notice of the first review Opinion for Chinese Application 201910440985.2 Aug. 30, 2024 16 Pages (With Translation).

* cited by examiner

AIR CONDITIONER

CROSS-REFERENCE TO RELATED APPLICATIONS

This application is a National Stage Entry under 35 U.S.C. § 371 of International Application No. PCT/CN2019/097482, filed on Jul. 24, 2019, which is based on and claims priority to four Chinese Patent Application Nos. 201920775234.1, 201920770372.0, 201920770375.4, 201910440985.2, all filed on May 24, 2019, the entire contents of all of which are incorporated herein by reference.

FIELD

The present application relates to the field of air conditioning technologies, and more particularly, to an air conditioner.

BACKGROUND

In the process of reducing environment temperature by portable air conditioners in related art, as heat is generated, typically exhaust tubes are employed to discharge heat out of a room. Therefore, due to the limitation of the exhaust tubes, the portable air conditioners have limited movement range, and cannot be moved arbitrarily.

SUMMARY

The present application seeks to solve at least one of the problems existing in the related art. To this end, the present application proposes an air conditioner, in which a liquid pump system can accompany no heat air discharge in the process of delivering cold from the liquid pump system to the environment, to avoid employing an exhaust tube and facilitate use of the air conditioner.

The air conditioner according to embodiments of the present application includes a housing; a compressor system provided in the housing and including a first heat exchanger, a second heat exchanger, a compressor and a throttle device circularly communicated, a refrigerant circulating in the compressor system; and a liquid pump system provided in the housing and including a third heat exchanger, an energy storage device and a liquid pump device circularly communicated, a coolant circulating in the liquid pump system, the energy storage device including an energy storage medium receiving energy from the second heat exchanger and storing the energy, the coolant exchanging heat with the energy storage medium.

With the air conditioner according to embodiments of the present application, in the process of delivering cold from the liquid pump system to the environment through the third heat exchanger, the coolant exchanges heat with the energy storage medium to release heat to the energy storage medium, such that the liquid pump system will not discharge heat to the environment, an exhaust tube of the air conditioner for discharging hot air can be omitted, and the arrangement position of the air conditioner is not limited.

In some embodiments, the energy storage device includes: a storage container internally containing the energy storage medium, the second heat exchanger being provided in the energy storage medium, the energy storage medium receiving energy from the second heat exchanger and storing the energy; and a fourth heat exchanger provided in the energy storage medium, to receive energy from the energy storage medium, the liquid pump device being coupled between the third heat exchanger and the fourth heat exchanger, to circulate the coolant between the third heat exchanger and the fourth heat exchanger.

In some embodiments, inside the housing there are an upper accommodation space and a lower accommodation space, at least one of the first heat exchanger or the third heat exchanger is located in the upper accommodation space, and at least one of the second heat exchanger or the energy storage device is located in the lower accommodation space.

In some embodiments, inside the housing there is further an intermediate accommodation space located between the upper accommodation space and the lower accommodation space, and the compressor is located in the intermediate accommodation space.

In some embodiments, inside the housing there is further an intermediate accommodation space located between the upper accommodation space and the lower accommodation space, and the liquid pump device is located in the intermediate accommodation space.

In some embodiments, inside the housing there is a first air passage, the air conditioner further includes a first ventilation device, the third heat exchanger is provided in the first air passage, and the first ventilation device ventilates the first air passage.

In some embodiments, the air conditioner further includes a power storage device at least electrically coupled to the liquid pump device and the first ventilation device, to provide power to the liquid pump device and the first ventilation device.

In some embodiments, inside the housing there is further a second air passage, the air conditioner further includes a second ventilation device, the first heat exchanger is provided in the second air passage, and the second ventilation device ventilates the second air passage.

In some embodiments, inside the storage container there is a containing chamber, the containing chamber internally contains the energy storage medium, the energy storage device further includes an upper fixation member and a lower positioning member, the upper fixation member is provided to upper portions of the second heat exchanger and the fourth heat exchanger and the upper fixation member is fixed on the storage container, the lower positioning member is fixed to lower portions of the second heat exchanger and the fourth heat exchanger and the lower positioning member is positioned at a bottom wall of the containing chamber.

In some embodiments, the upper fixation member is fitted over a refrigerant tube of the heat exchange assembly, a positioning groove is formed at the bottom wall of the containing chamber, and the lower positioning member is inserted in the positioning groove.

In some embodiments, at least a group of opposite side walls of the positioning groove extend obliquely downwards towards each other to form first guide faces, at least a group of opposite side walls of the lower positioning member extend obliquely downwards towards each other to form second guide faces, and the first guide faces are fitted with the second guide faces in one-to-one correspondence.

In some embodiments, an inner wall of the containing chamber is provided with a fixation protrusion, and the upper fixation member is fixed on an upper surface of the fixation protrusion.

In some embodiments, each of the second heat exchanger and the fourth heat exchanger is provided with the refrigerant tube, the lower positioning member is provided with sleeve members fitted over the refrigerant tubes and in contact with the refrigerant tubes to position the lower positioning member on the second heat exchanger and the fourth heat exchanger.

In some embodiments, the storage container includes a casing and a top cover, and the casing includes: an outer casing having an open top; and an inner casing having an open top and provided in the outer casing, the inner casing and the outer casing being provided with a circumferential wall insulation layer therebetween, and the containing chamber is provided in the inner casing, the top cover being provided on the casing to close the containing chamber.

In some embodiments, the top cover is provided with a top insulation layer.

In some embodiments, the air conditioner further includes a seal ring provided between the top cover and a top wall of the inner casing.

In some embodiments, a first placement groove is formed at a bottom wall of the top cover, at least a part of the seal ring is accommodated in the first placement groove, the top cover is provided with a first snap member and a first fixation hole, the first snap member is snap-fitted with the inner casing, a second fixation hole facing the first fixation hole is formed at the top wall of the inner casing, and a fixation coupling member passes through the first fixation hole and is fixed in the second fixation hole.

In some embodiments, a plurality of first snap members are provided, the plurality of first snap members are spaced apart in a circumferential direction of the seal ring, and each first snap member is snap-fitted with the inner casing.

In some embodiments, the second heat exchanger has an inlet tube and an outlet tube, the inlet tube and the outlet tube separately extend out of the storage container; the fourth heat exchanger has a liquid reception tube and a liquid outlet tube, the liquid reception tube and the liquid outlet tube separately extend out of the storage container; and a plurality of avoidance holes are formed at the top cover, and the inlet tube, the outlet tube, the liquid reception tube and the liquid outlet tube extend out of the storage container through the avoidance holes, respectively.

In some embodiments, the air conditioner further includes waterproof seal members provided between the inlet tube and an inner wall of the avoidance hole, between the outlet tube and the inner wall of the avoidance hole, between the liquid reception tube and the inner wall of the avoidance hole, and between the liquid outlet tube and the inner wall of the avoidance hole, respectively.

In some embodiments, the waterproof seal member is provided with an annular separation prevention protrusion, and at least a part of the separation prevention protrusion is provided between the top cover and the inner casing.

In some embodiments, the top cover is provided with a liquid filling tube in communication with the inner casing.

Additional aspects and advantages of the present application will be given in part in the following descriptions, become apparent in part from the following descriptions, or be learned from the practice of the present application.

Figure 1:
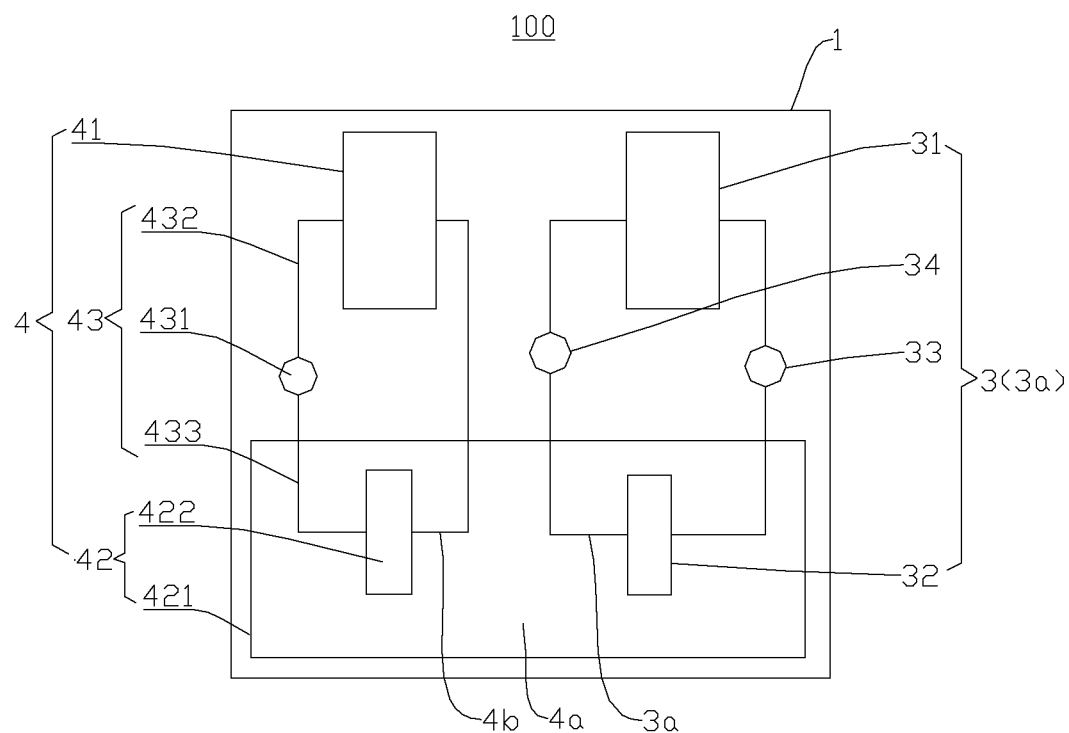
FIG. 1 is a schematic system diagram of an air conditioner according to an embodiment of the present application.

REFERENCE NUMERALS air conditioner 100;
housing 1;
front surface 11; air outlet 111; rear surface 12; air inlet 121;
air passage 13; first air passage 13a; second air passage 13b;
upper accommodation space 14; lower accommodation space 15; intermediate accommodation space 16; installation cavity 17; accessing opening 18;
ventilation device 2; fan assembly 21; first ventilation device 2a; second ventilation device 2b;
compressor system 3; cooling only system 3a; heat pump system 3b;

first heat exchanger 31; second heat exchanger 32; compressor 33; throttle element 34; four-way valve 35;
liquid pump system 4; third heat exchanger 41; first port 410; sump 411; drain tube 412;
energy storage device 42; second port 420;
storage container 421; fourth heat exchanger 422; pipe 423;
liquid pump device 43; circlip 44;
flexible tube 430; first pump 431; first connector 4311; second connector 4312;
first pipe assembly 432; first pipe 4321; first end 4321a; second end 4321b;
second pipe assembly 433; second pipe 4331; third end 4331a; fourth end 4331b;
water collection device 5;
water collection pan 51;
body 511; partition plate 512;
bottom wall 5111; side wall 5112;
chamber 5113; atomization chamber 5113a; overflow chamber 5113b; drain hole 5113b1;
atomizer 52;
water receiver 53; water inlet 530; transparent side plate 531; handle structure 532;
wheel device 6; water pumping device 7; second pump 71; first flexible tube 72; second flexible tube 73,
casing 701, outer casing 7011, inner casing 7012, second fixation hole 70121, installation lug 70122, circumferential wall insulation layer 7013, top cover 702, accommodation groove 7021, first placement groove 7022, first fixation hole 7023, avoidance hole 7024, containing chamber 703, positioning groove 704, first guide face 705, fixation protrusion 706, top insulation layer 707, first snap member 708,
heat exchange assembly 710, upper fixation member 711, lower positioning member 712, second guide face 7120, refrigerant tube 713, sleeve member 715, inlet tube 7101, outlet tube 7102,
seal ring 720,
waterproof seal member 75, separation prevention protrusion 750,
liquid filling tube 74.

DETAILED DESCRIPTION OF THE DISCLOSURE

Embodiments of the present application will be described in detail below, examples of the embodiments are illustrated in the drawings, in which the same or similar elements and the elements having same or similar functions are denoted by like reference numerals throughout the descriptions. The embodiments described herein with reference to drawings are explanatory, used to generally explain the present application, and should not be construed as limitation to the present application.

Various embodiments or examples are provided in the following description to implement different structures of the present application. In order to simplify the disclosure of the present application, certain elements and settings will be described. Certainly, these elements and settings are only by way of example and are not intended to limit the present disclosure. In addition, reference numerals and/or letters may be repeated in different examples in the present application. This repeating is for the purpose of simplification and clarity and does not refer to relations between different embodiments and/or settings. Furthermore, examples of different processes and materials are provided in the present application. However, it would be appreciated by those skilled in the art that other processes and/or materials may be also applied.

Hereinafter, an air conditioner 100 according to embodiments of the present application will be described.

As illustrated in FIG. 1, the air conditioner 100 according to embodiments of the present application may include a compressor system 3 and a liquid pump system 4.

Figure 2:
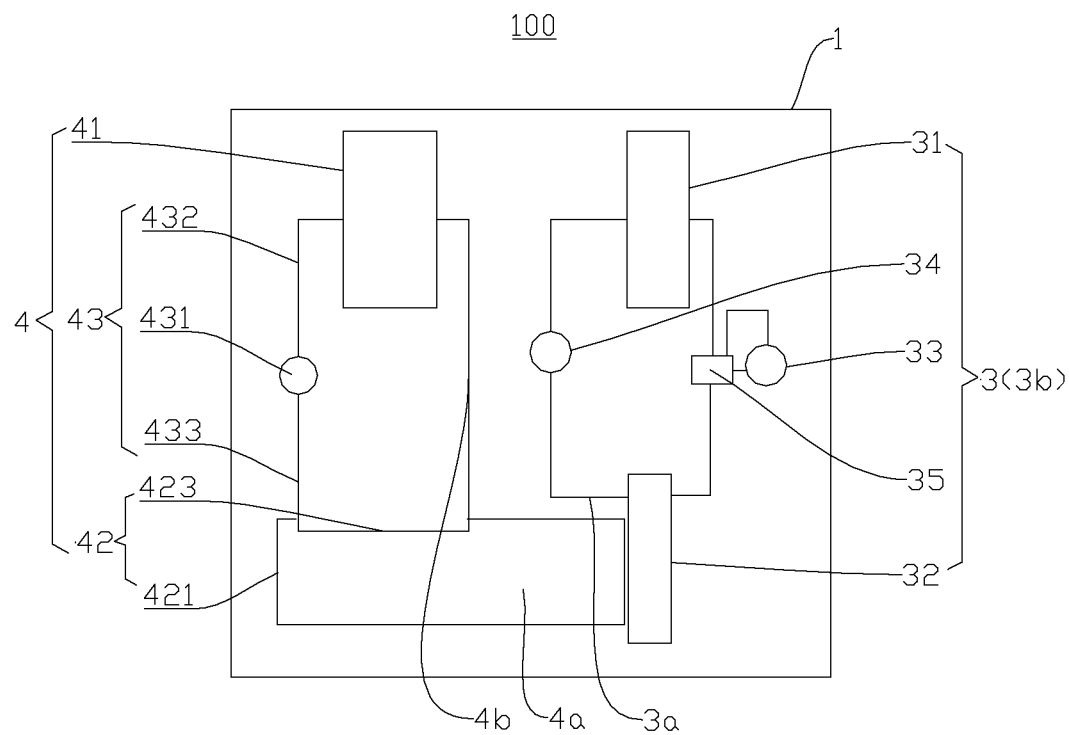
FIG. 2 is a schematic system diagram of an air conditioner according to another embodiment of the present application.

As illustrated in FIG. 1, the compressor system 3 may include a first heat exchanger 31, a second heat exchanger 32, a compressor 33 and a throttle element 34 that are circularly communicated. Refrigerant 3a circulates in the compressor system 3. The compressor system 3 may be a cooling only system 3a (as illustrated in FIG. 1) or a heat pump system 3b (as illustrated in FIG. 2). With reference to FIG. 2, when the compressor system 3 is a heat pump system 3b, the compressor system 3 may also include a four-way valve 35. Concepts, other configurations and work principles of the "cooling only system" and the "heat pump system" are all well known by those skilled in the art.

The configurations and work process of the compressor system 3 are briefly introduced below by taking the case where the compressor system 3 is a cooling only system 3a as an example, and after reading the following technical solution, those skilled in the art can obviously appreciate the configurations and work process of the compressor system 3 as a heat pump system 3b. As illustrated in FIG. 1, when the compressor system 3 is a cooling only system 3a, an outlet of compressor 33 is in communication with an inlet of the first heat exchanger 31, an outlet of the first heat exchanger 31 is in communication with an inlet of the throttle element 34, an outlet of the throttle element 34 is in communication with an inlet of the second heat exchanger 32, and an outlet of the second heat exchanger 32 is in communication with an inlet of the compressor 33. In this case, the first heat exchanger 31 is a condenser for heat exchange with the environment to achieve heat release, and the second heat exchanger 32 is an evaporator for heat exchange with the environment to achieve heat absorption (i.e., cold release). When the cooling only system 3a is in operation, the refrigerant 3a in the compressor system 3 circulates through the compressor 33, the first heat exchanger 31 (i.e., the condenser), the throttle element 34, and the second heat exchanger 32 (i.e., the evaporator) in sequence, to realize refrigeration cycle.

As illustrated in FIG. 1, the liquid pump system 4 may include a third heat exchanger 41, an energy storage device 42 and a liquid pump device 43 that are circularly communicated. Coolant 4b circulates in the liquid pump system 4. That is, the liquid pump device 43 is coupled between the third heat exchanger 41 and the energy storage device 42, and the liquid pump device 43 circulates the coolant 4b between the third heat exchanger 41 and the energy storage device 42; or rather, the liquid pump device 43, the third heat exchanger 41 and the energy storage device 42 constitute a circulation circuit. When the liquid pump device 43 is in operation, the coolant 4b in the third heat exchanger 41 can flow to the energy storage device 42, and the coolant 4b in the energy storage device 42 can flow back to the third heat exchanger 41, and the circulation repeats this way.

As illustrated in FIG. 1, the energy storage device 42 also includes an energy storage medium 4a that receives energy from the second heat exchanger 32 and stores the energy. That is to say, when the compressor system 3 is the cooling only system 3a or the heat pump system 3b and performs a cooling mode, the second heat exchanger 32 releases cold to the energy storage medium 4a, and the energy storage medium 4a absorbs cold from the second heat exchanger 32 and stores the cold; while when the compressor system 3 is the heat pump system 3b and performs a heating mode, the second heat exchanger 32 release heat to the energy storage medium 4a, and the energy storage medium 4a absorbs heat from the second heat exchanger 32 and stores the heat.

As illustrated in FIG. 1, the coolant 4b exchanges heat with the energy storage medium 4a, that is to say, the energy storage medium 4a receives energy (i.e., heat or cold) from the second heat exchanger 32 and stores the energy, and it can be heat-exchanged to the coolant 4b, to be carried and delivered by the coolant 4b. In this way, when the liquid pump system 4 is in operation, the coolant 4b can transfer the energy in the energy storage medium 4a, and release it to the environment through the third heat exchanger 41, to change environmental temperature. For example, when cold is stored in the energy storage medium 4a, the coolant 4b absorbs the cold from the energy storage medium 4a and transfers it, and releases it to the environment through the third heat exchanger 41, to reduce the environmental temperature. As another example, when heat is stored in the energy storage medium 4a, the coolant 4b absorbs heat from the energy storage medium 4a and transfers it, and releases it through the third heat exchanger 41 to the environment, to increase the environmental temperature.

Thus, with the air conditioner 100 according to embodiments of the present application, in the process of delivering cold from the liquid pump system 4 to the environment through the third heat exchanger 41, the coolant 4b exchanges heat with the energy storage medium 4a to release heat to the energy storage medium 4a, such that the liquid pump system 4 will not discharge heat to the environment, an exhaust tube of the air conditioner 100 for discharging hot air can be omitted, and the arrangement position of the air conditioner is not limited and can be moved arbitrarily.

In some specific embodiments of the present application, the compressor system 3 in the air conditioner 100 may be similar to a refrigeration system in a refrigerator, to make the energy storage medium 4a into ice; furthermore, the liquid pump system 4 can substitute a refrigeration system in a portable air conditioner, and utilize the energy storage medium 4a to get cold from the second heat exchanger 32 in the compressor system 3 and store the cold, and release the cold to the environment through the coolant 4b and the third heat exchanger 41, to reduce the environmental temperature. In this way, during operation of the liquid pump system 4, the coolant 4b exchanges heat with the energy storage medium 4a to release heat to the energy storage medium 4a, thus, the liquid pump system 4 can omit an exhaust tube or the like for discharging hot air compared to a refrigeration system of the portable air conditioner in the related art, and the air conditioner 100 can be moved arbitrarily, to have wide usage scenarios without restrictions.

Additionally, in some embodiments of the present application, by providing the liquid pump system 4 having the energy storage medium 4a, the compressor system 3 and the liquid pump system 4 may also operate at different times. For example, the compressor system 3 may operate first, the energy storage device 42 stores energy from the second heat exchanger 32, then the compressor system 3 may be switched off, to reduce energy consumption and noises. Later, when the environmental temperature needs to be adjusted, the liquid pump system 4 may be started, and the third heat exchanger 41 exchanges heat with the environment by utilizing the energy stored by the energy storage device 42, to adjust the environmental temperature.

Additionally, when the liquid pump system 4 is utilized to reduce the environmental temperature, the coolant 4b in the liquid pump system 4 exchanges cold with the environment while exchanging heat with the energy storage medium 4a, thus indicating that the coolant 4b will not intensively discharge heat to the environment. Moreover, in the process of the operation of the liquid pump system 4, the compressor system 3 may not operate, thus the compressor system 3 may also not discharge heat to the environment. Therefore, when the air conditioner 100 reduces the environmental temperature, no heat discharge to the environment may be accompanied, and reliability of the reduction in environmental temperature by the liquid pump system 4 can be ensured; furthermore, the air conditioner 100 may also omit an exhaust tube for discharging hot air, the air conditioner 100 may be placed anywhere, and when the air conditioner 100 is a portable air conditioner it can be moved arbitrarily, to have wide usage scenarios without restrictions. Certainly, the present application is not limited to this, and the air conditioner 100 is not limited to the portable air conditioner.

Hereinafter, the energy storage device 42 according to some embodiments of the present application will be described.

Specifically, the energy storage device 42 according to embodiments of the present application may be of various types, the energy storage device 42 according to embodiments of the present application will be introduced by way of two specific embodiments. However, the energy storage device 42 of embodiments of the present application is not limited to the following two embodiments.

Embodiment I

In the present Embodiment I, as illustrated in FIG. 1, the energy storage device 42 may include a storage container 421 and a fourth heat exchanger 422. The storage container 421 internally contains the energy storage medium 4a, the second heat exchanger 32 is provided in the energy storage medium 4a, and the energy storage medium 4a receives energy from the second heat exchanger 32 and stores the energy. The fourth heat exchanger 422 is provided in the energy storage medium 4a to receive energy from the energy storage medium 4a, the liquid pump device 43 is coupled between the third heat exchanger 41 and the fourth heat exchanger 422, to circulate the coolant 4b between the third heat exchanger 41 and the fourth heat exchanger 422.

Specifically, when the compressor system 3 is in operation, the second heat exchanger 32 may release heat or cold to the energy storage medium 4a in the storage container 421, to change the temperature of the energy storage medium 4a for energy storage, and then the compressor system 3 may be switched off, to save electrical energy and reduce noises. The liquid pump device 43 may be then turned on, to make the liquid pump system 4 into operation. In this case, the coolant 4b in the fourth heat exchanger 422 absorbs energy from the energy storage medium 4a, and delivers it to the third heat exchanger 41 under the action of the liquid pump device 43, to make the third heat exchanger 41 exchange heat with the environment (i.e., releasing cold or heat); the coolant 4b after heat exchange in the third heat exchanger 41 is delivered back to the fourth heat exchanger 422 under the action of the liquid pump device 43, to continue to receive energy from the energy storage medium 4a; moreover, the circulation is repeated, and the energy in the energy storage medium 4a can be taken out and released to the environment gradually, to adjust the environmental temperature.

It should be noted that, in the present Embodiment I, the specific type of the energy storage medium 4a is not limited. For example, it may be water, etc. When the compressor system 3 renders the energy storage medium 4a to store cold, the water can be iced, to better store the cold, which is cost-effective and has good effect of storing and getting cold. Moreover, in the present Embodiment I, specific type of the coolant 4b circulated in the liquid pump system 4 is also not limited. For example, it may be alcohol solution, such as methanol, ethylene glycol, glycerol or low-carbon alcohol hydrate, etc., to improve effect of getting and releasing cold. However, it should be noted that, the energy storage medium 4a and the coolant 4b are not specifically limited, as long as a freezing point of the coolant 4b is lower than a cold storage temperature of the energy storage medium 4a, and the coolant 4b is ensured to circulate without freezing. In addition, when the liquid pump device 43 is configured to increase the environmental temperature, materials of the energy storage medium 4a and the coolant 4b can also be specifically selected according to actual requirements, which is not limited herein.

Embodiment II

In the present Embodiment II, as illustrated in FIG. 2, the energy storage device 42 may also not include the fourth heat exchanger 422, and the second heat exchanger 32 may not be provided in the storage container 421. In this case, the energy storage device 42 may include a pipe 423, and the coolant 4b circulates in the pipe 423. The pipe 423 may be provided inside or outside the storage container 421 to exchange heat with the energy storage medium 4a. The second heat exchanger 32 is provided outside the storage container 421 and close to or in contact with the storage container 421 to exchange heat with the energy storage medium 4a. Thus, normal operation of the liquid pump system 4 can similarly achieved, which is not repeated herein.

Hereinafter, for simplification of description, the case where the liquid pump system 4 is configured to reduce the environmental temperature is taken as an example for illustration, and after reading the following technical solution, those skilled in the art can obviously appreciate the technical solution to the case where the liquid pump system 4 is used to increase the environmental temperature.

Hereinafter, the liquid pump device 43 according to some embodiments of the present application will be described.

In some embodiments, as illustrated in FIGS. 1 and 2, the liquid pump device 43 includes a first pump 431, a first pipe assembly 432 and a second pipe assembly 433. The first pump 431 is coupled to the third heat exchanger 41 through the first pipe assembly 432, and the first pump 431 is coupled to the energy storage device 42 through the second pipe assembly 433. That is to say, the refrigerant may be circulated between the first pump 431 and the third heat exchanger 41 through the first pipe assembly 432, and the refrigerant may be circulated between the first pump 431 and the energy storage device 42 through the second pipe assembly 432.

In some embodiments, at least one of the first pipe assembly 432 or the second pipe assembly 433 includes a flexible tube 430. That is to say, the first pipe assembly 432 may include the flexible tube 430, or the second pipe assembly 433 may include the flexible tube 430, or both of the first pipe assembly 432 and the second pipe assembly 433 may include the flexible tube 430.

When the first pipe assembly 432 includes the flexible tube 430, at least part of coupling between the first pump 431 and the third heat exchanger 41 is flexible coupling, and relative position between the first pump 431 and the third heat exchanger 41 can be adjusted according to requirements, to facilitate assembly. When the second pipe assembly 433 includes the flexible tube 430, at least part of coupling between the first pump 431 and the energy storage device 42 is flexible coupling, and relative position between the first pump 431 and the energy storage device 42 can be adjusted according to requirements, to facilitate assembly.

In the air conditioner 100 according to embodiments of the present application, since at least one of the first pipe assembly 432 or the second pipe assembly 433 includes the flexible tube 430, the assembly is facilitated, the assembly difficulty is reduced and the assembly efficiency is promoted. In addition, when the above-described flexible tube 430 is a flexible insulation pipe, i.e., a flexible tube 430 with thermal insulation function, e.g., an insulation rubber pipe, cold loss of the refrigerant during delivery can be reduced, constancy of the cold of the refrigerant flowing through the flexible tube 430 can be improved, and cold release effect of the third heat exchanger 41 is improved in a disguised form. Certainly, the present application is not limited to this, and in other embodiments of the present application, the flexible tube 430 may not be made of insulating materials.

As an example illustrated in FIG. 1, when the liquid pump device 43 according to embodiments of the present application is applied in the energy storage device 42 of the above-described Embodiment I, the first pump 431 is provided outside the storage container 421 and is coupled to the fourth heat exchanger 422 through the second pipe assembly 433, to circulate the coolant 4b between the fourth heat exchanger 422 and the third heat exchanger 41.

As another example illustrated in FIG. 2, the liquid pump device 43 according to embodiments of the present application is applied in the energy storage device 42 of the above-described Embodiment II, the first pump 431 is provided outside the container 421 and is coupled to the pipe 423 through the second pipe assembly 433, to circulate the refrigerant 4c between the pipe 423 and the third heat exchanger 41.

It should be noted that, the liquid pump device 43 may be coupled between an inlet of the third heat exchanger 41 and an outlet of the energy storage device 42, or the liquid pump device 43 may be coupled between an outlet of the third heat exchanger 41 and an inlet of the energy storage device 42. Furthermore, liquid pump devices 43 may be respectively provided between the inlet of the third heat exchanger 41 and the outlet of the energy storage device 42 and between the outlet of the third heat exchanger 41 and the inlet of the energy storage device 42.

No matter which of the above understanding is adapted, in order for simplification of description, a connector of the first pump 431 configured to couple the third heat exchanger 41 is defined as a first connector 4311 (the material of the first connector 4311 is not limited and can be, e.g., steel, cast iron, etc.); a port of the third heat exchanger 41 configured to couple the first pump 431 is defined as a first port 410 (the material of the first port 410 is not limited, and for example, it may be a tube orifice of a copper tube, etc.); a connector of the first pump 431 configured to couple the energy storage device 42 is defined as a second connector 4312 (the material of the second connector 4312 is not limited and can be, e.g., steel, cast iron, etc.); and a port of the energy storage device 42 configured to couple the first pump 431 is defined as a second port 420 (the material of the second port 420 is not limited, and for example, it may be a tube orifice of a copper tube, etc.).

Figure 3:
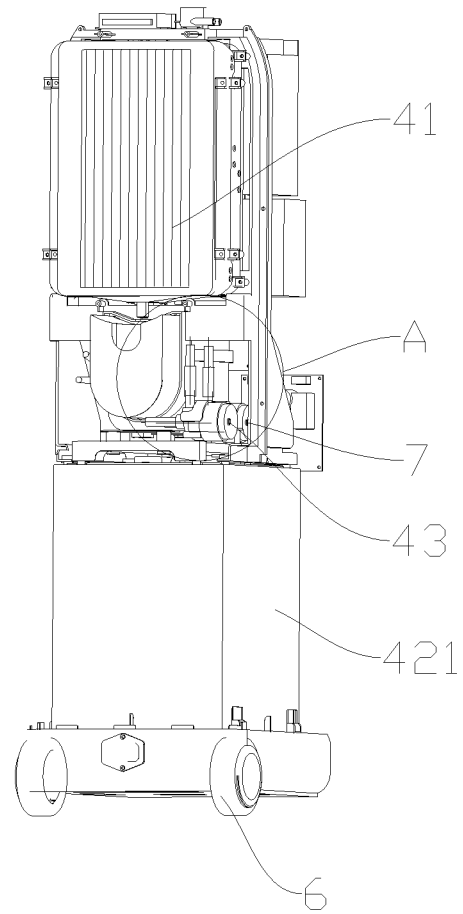
FIG. 3 is an internal structural diagram of an air conditioner according to an embodiment of the present application.
Figure 4:
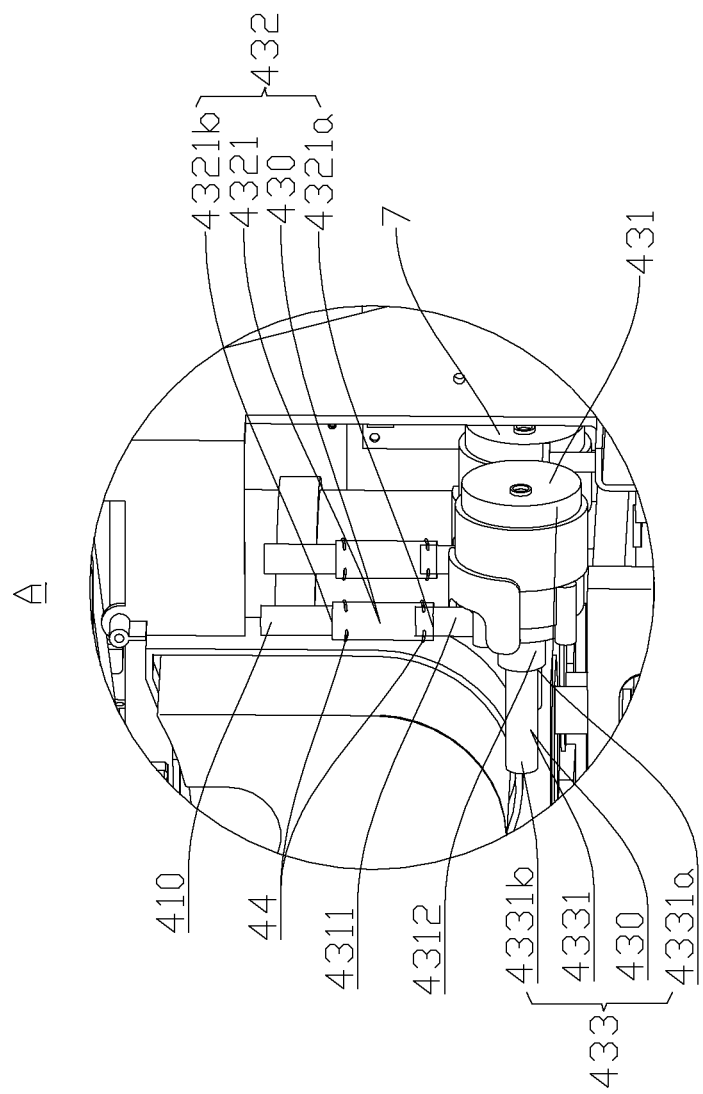
FIG. 4 is an enlarged view of portion A circled in FIG. 3.

In some embodiments, as illustrated in FIGS. 3 and 4, the first pipe assembly 432 may include a first pipe 4321. Two ends of the first pipe 4321 are a first end 4321a and a second end 4321b. The first end 4321a is coupled to the first connector 4311 of the first pump 431, the second end 4321b is coupled to the first port 410 of the third heat exchanger 41, and the first pipe 4321 is the flexible tube 430. Thus, by coupling the first pump 431 to the third heat exchanger 41 through the first pipe 4321 employing the flexible tube 430, the relative position of the first pump 431 and the third heat exchanger 41 may be adjusted conveniently during assembly, to reduce assembly difficulty and promote assembly efficiency.

As illustrated in FIG. 4, coupling manner between the first end 4321a of the first pipe 4321 and the first connector 4311 of the first pump 431 is not limited. For example, they may be coupled by ultrasonic welding, to improve coupling reliability; as another example, they may be also fixedly coupled by a circlip 44, that is, the first end 4321a is fitted over the first connector 4311, and then the circlip 44 is fitted over the first end 4321a to realize the fastening, reduce assembly difficulty and promote assembly efficiency. Additionally, when the first end 4321a and the first connector 4311 have different materials, the coupling can be readily realized by the first pipe 4321 employing the flexible tube 430.

As illustrated in FIG. 4, coupling manner of the second end 4321b of the first pipe 4321 and the first port 410 of the third heat exchanger 41 is not limited. For example, they may be coupled by ultrasonic welding, to improve coupling reliability; as another example, they may also be fixedly coupled by a circlip 44, that is, the second end 4321b is fitted over the first port 410, and then the circlip 44 is fitted over the second end 4321b to realize the fastening, reduce assembly difficulty and promote assembly efficiency. Additionally, when the second end 4321b and the first port 410 have different materials, the coupling can be readily realized by the first pipe 4321 employing the flexible tube 430.

In some embodiments, as illustrated in FIG. 4, the second pipe assembly 433 may include a second pipe 4331. Two ends of the second pipe 4331 are a third end 4331a and a fourth end 4331b. The third end 4331a is coupled to the second connector 4312 of the first pump 431, the fourth end 4331b is coupled to the second port 420 of the energy storage device 42 (referring to FIG. 6), and the second pipe 4331 is a flexible tube 430. Thus, by coupling the first pump 431 to the energy storage device 42 through the second pipe 4331 employing the flexible tube 430, relative position of the first pump 431 and the energy storage device 42 may be adjusted conveniently, to reduce assembly difficulty and promote assembly efficiency.

In some embodiments, coupling manner of the third end 4331a of the second pipe 4331 and the second connector 4312 of the first pump 431 is not limited. For example, they may be coupled by ultrasonic welding, to improve coupling reliability; as another example, they may be also fixedly coupled by a circlip 44, that is, the third end 4331a is fitted over the second connector 4312, and then the circlip 44 is fitted over the third end 4331a to realize fastening, reduce assembly difficulty and promote assembly efficiency. Additionally, when the third end 4331a and the second connector 4312 have different materials, the coupling can be readily realized by the second pipe 4331 employing the flexible tube 430.

In some embodiments, coupling manner of the fourth end 4331b of the second pipe 4331 and the second port 420 of the energy storage device 42 is not limited. For example, they may be coupled by ultrasonic welding, to improve coupling reliability; as another example, they may be also fixedly coupled by a circlip 44, that is, the fourth end 4331b is fitted over the second port 420, and then the circlip 44 is fitted over the fourth end 4331b to realize the fastening, reduce assembly difficulty and promote assembly efficiency. Additionally, when the fourth end 4331b and the second port 420 have different materials, the coupling can be readily realized by the second pipe 4331 employing the flexible tube 430.

Hereinafter, some specific embodiments of structural arrangement of an air conditioner 100 according to the present application are described.

Figure 5:
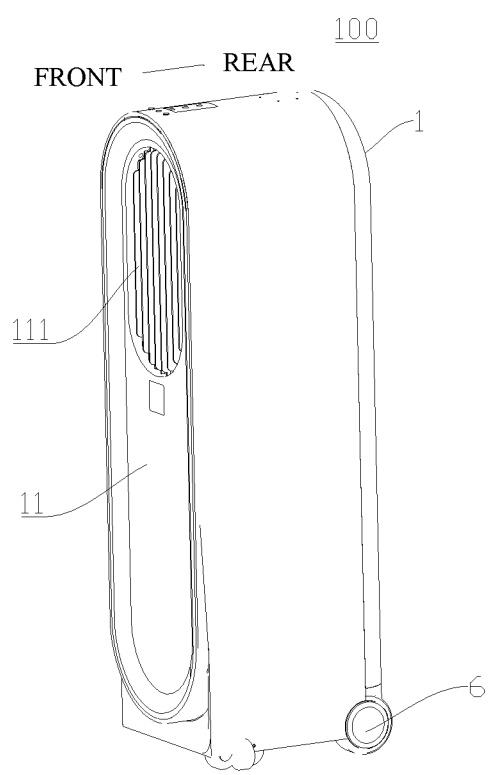
FIG. 5 is a perspective view of an air conditioner according to an embodiment of the present application.

As illustrated in FIG. 5, the air conditioner 100 according to embodiments of the present application further includes a housing 1. The compressor system 3 and the liquid pump system 4 are both provided in the housing 1 (referring to FIGS. 1 and 2) to be protected by the housing 1, and the air conditioner 100 is enabled to be moved, transported, installed and used conveniently as one integral module.

Figure 14:
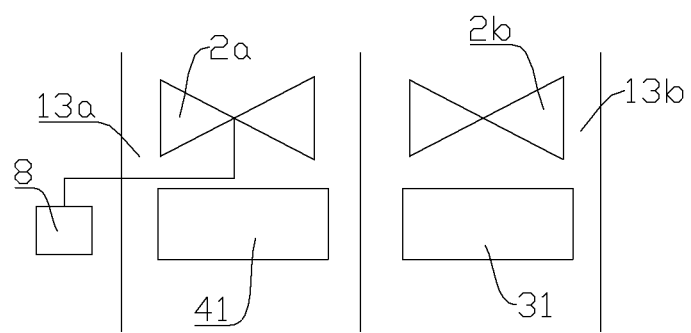
FIG. 14 is a schematic view of an air conditioner according to an embodiment of the present application.

Referring to FIG. 14, in some embodiments, inside the housing 1 there may be a first air passage 13a, and the air conditioner 100 may further include a first ventilation device 2a. The third heat exchanger 41 is provided in the first air passage 13a, and the first ventilation device 2a ventilates the first air passage 13a. Thus, speed of heat exchange of the third heat exchanger 41 and the environment can be increased, to adjust the environmental temperature rapidly.

Referring to FIG. 14, the air conditioner 100 may also include a power storage device 8 (referring to FIG. 14). The power storage device 8 is at least electrically coupled to the liquid pump device 43 and the first ventilation device 2a, to provide power to the liquid pump device 43 and the first ventilation device 2a. Thus, the air conditioner 100 may serve as a portable air conditioner, and after completion of operation of the compressor system 3, a power source may be cut off. For example, the power storage device 8 may be used to provide power to the liquid pump device 43 and the first ventilation device 2a, thus the movement range of the air conditioner 100 is not limited, to expand range of application of the air conditioner 100.

Referring to FIG. 14, in some embodiments, inside the housing 1 there may also be a second air passage 13b, and the air conditioner 100 may further include a second ventilation device 2b. The first heat exchanger 31 is provided in the second air passage 13b, and the second ventilation device 2b ventilates the second air passage 13b. Thus, speed of heat exchange of the first heat exchanger 31 and the environment can be increased, to allow the energy storage medium 4a to store energy rapidly.

Certainly, the present application is not limited to this, in some other embodiments of the present application, the first ventilation device 2a and the second ventilation device 2b may not be provided, and in this case the heat exchange can be realized by natural wind. In addition, the specific choice of the power storage device 8 is not limited and can be, e.g., a battery or a storage battery, etc.

In some specific examples, as illustrated in FIG. 14, the first air passage 13a and the second air passage 13b may be different air passages, and the first ventilation device 2a and the second ventilation device 2b may be different ventilation devices. That is to say, the first air passage 13a and the second air passage 13b are independent of each other, the first ventilation device 2a and the second ventilation device 2*b* are independent of each other, and airflows of the first air passage 13*a* and the second air passage 13*b* do not affect each other. In this case, the compressor system 3 and the liquid pump system 4 may operate at the same time, and do not interfere with each other.

Figure 8:
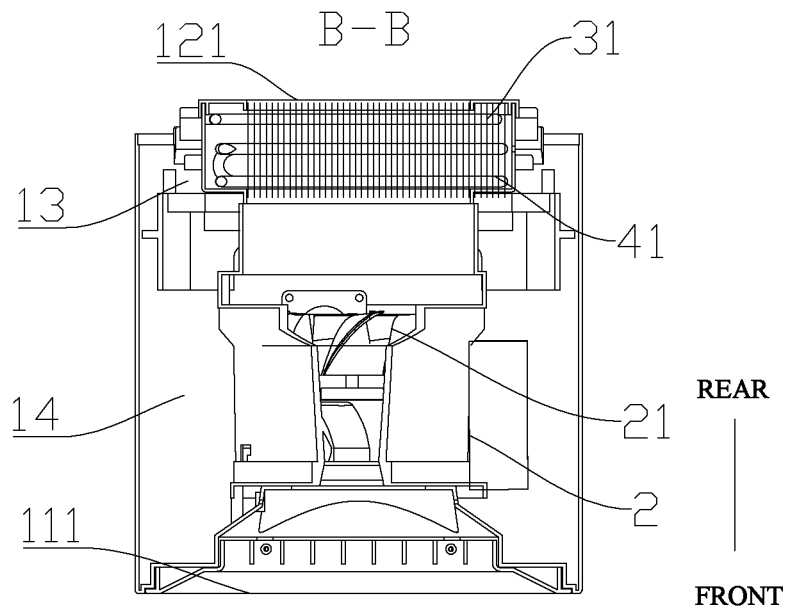
FIG. 8 is a cross-sectional view taken along line B-B in FIG. 7.

In other specific examples, as illustrated in FIG. 8, the first air passage 13*a* and the second air passage 13*b* may be the same air passage 13, and the first ventilation device 2*a* and the second ventilation device 2*b* may be the same ventilation device 2. That is to say, the first heat exchanger 31 and the third heat exchanger 41 share the same air passage 13, and share the same ventilation device 2. Thus, the whole structure may be simplified, and in this case, the compressor system 3 and the liquid pump system 4 may not operate at the same time.

Hereinafter, only the case where the first heat exchanger 31 and the third heat exchanger 41 share the same air passage 13, and share the same ventilation device 2 is taken as an example for illustration, and after reading the following technical solution, those skilled in the art can obviously appreciate the technical solution that the first heat exchanger 31 and the third heat exchanger 41 do not share the same air passage and do not share the same ventilation device.

As illustrated in FIG. 8, when the first air passage and the second air passage are the same air passage 13 and the first ventilation device 2*a* and the second ventilation device 2*b* are the same ventilation device 2, along flow direction of the airflow in the air passage 13 (such as a direction from rear to front illustrated in FIG. 8), the third heat exchanger 41 may be located downstream of the first heat exchanger 31 (such as a front side illustrated in FIG. 8), and the ventilation device 2 is provided downstream of the third heat exchanger 41 (such as a front side illustrated in FIG. 8). Thus, operational effect of the third heat exchanger 41, the first heat exchanger 31 and the ventilation device 2 may be improved, which is specifically analyzed as follows.

Figure 6:
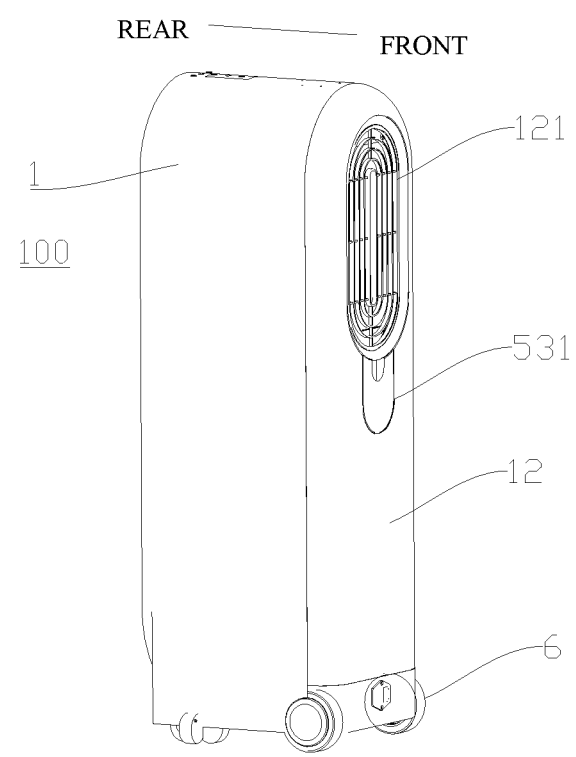
FIG. 6 is a perspective view of the air conditioner illustrated in FIG. 5 from another angle.
Figure 7:
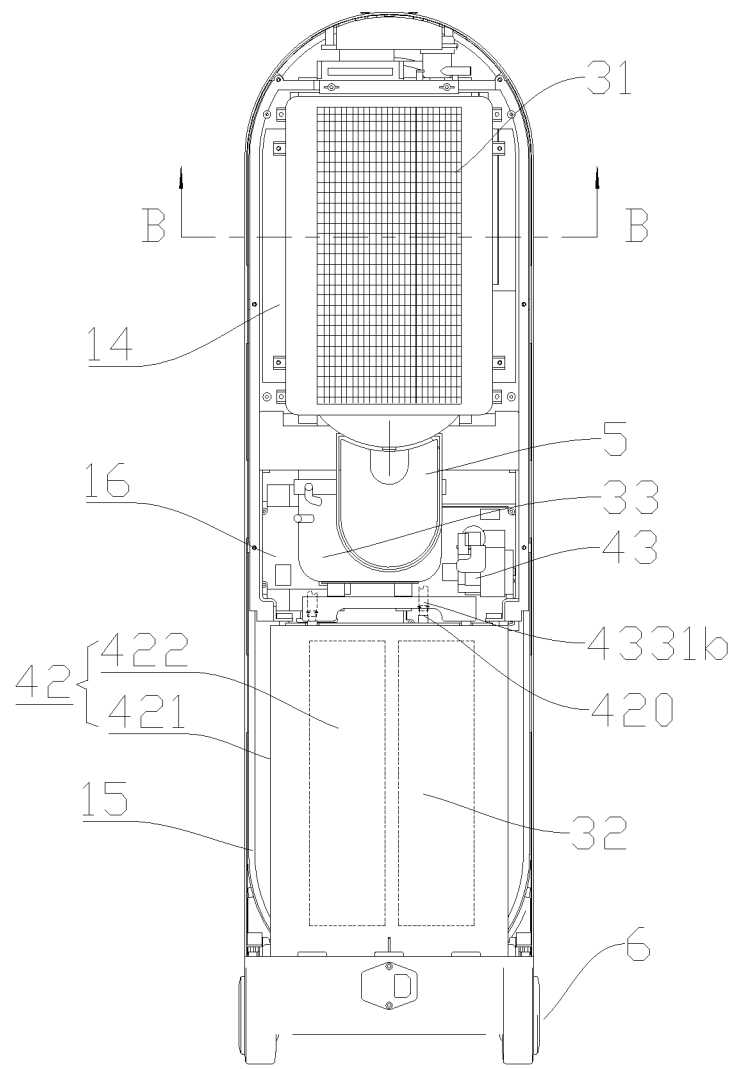
FIG. 7 is a cross-sectional view of the air conditioner illustrated in FIG. 5.

In some embodiments, as illustrated in FIGS. 5 and 6, the housing 1 may include an air inlet 121 and an air outlet 111. Referring to FIGS. 7 and 8, inside the housing 1 there is further an air passage 13 communicating the air inlet 121 with the air outlet 111, and the first heat exchanger 31 and the third heat exchanger 41 are both provided in the air passage 13. Referring to FIGS. 7 and 8, the air conditioner 100 may also include a ventilation device 2 configured to ventilate the airflow in the air passage 13. The ventilation device 2 is provided in the housing 1, to render the air passage 13 to suck in airflow from the air inlet 121 and discharge the airflow from the air outlet 111. That is to say, when the ventilation device 2 is in operation, the airflow may enter the air passage 13 through the air inlet 121, exchange heat with the first heat exchanger 31 and the third heat exchanger 41 in the air passage 13, and then be discharged from the air outlet 111.

As described above, the air conditioner 100 according to embodiments of the present application may be configured such that the compressor system 3 and the liquid pump system 4 do not operate at the same time. Therefore, when the compressor system 3 is in operation, the airflow entering the air passage 13 may exchange heat with the first heat exchanger 31 in operation, to realize rapid heat release of the first heat exchanger 31; when the liquid pump system 4 is in operation, the airflow entering the air passage 13 may exchange heat with the third heat exchanger 41 in operation, to realize rapid cold release of the third heat exchanger 41.

Thus, since the first heat exchanger 31 and the third heat exchanger 41 are both provided in the same air passage 13 and the air conditioner 100 may be configured such that the compressor system 3 and the liquid pump system 4 do not operate at the same time (that is, the compressor system 3 operates first to store energy, and then the liquid pump system 4 operates to release cold), the first heat exchanger 31 and the third heat exchanger 41 can share the same ventilation device 2, and complexity of the whole air conditioner 100 can be reduce, to make the air conditioner 100 have compact and miniature structure and low costs.

Additionally, it should be noted that, when the compressor system 3 or the liquid pump system 4 is in operation, the ventilation device 2 may not operate, and in this case, outside natural wind or an outside blowing device may be utilized to realize the heat exchange, to reduce energy consumption. Therefore, the air conditioner 100 according to embodiments of the present application may not include the ventilation device. In addition, when the ventilation device 2 and the liquid pump device 43 have small power consumption, the air conditioner 100 may further have a battery. In this way, when the air conditioner 100 only uses the liquid pump system 4 to operate, it is not necessary to couple a power cord. That is, after operation of the compressor system 3 is finished, the air conditioner 100 may get out of a plug-in mode, and the air conditioner 100 can be moved at any time, to expand movable range of the portable air conditioner, and meet requirements of different application scenarios.

In some embodiments, as illustrated in FIG. 8, the third heat exchanger 41 may be provided at a side of the first heat exchanger 31 close to the air outlet 111. That is to say, the third heat exchanger 41 is provided between the first heat exchanger 31 and the air outlet 111. Thus, it can be ensured that a distance between the third heat exchanger 41 and the air outlet 111 is small, and when the liquid pump system 4 is in operation, cold release effect of the third heat exchanger 41 can be improved, to better reduce the environmental temperature.

In some embodiments, as illustrated in FIG. 8, the ventilation device 2 may be provided at a side of the third heat exchanger 41 close to the air outlet 111. That is to say, the ventilation device 2 is provided between the third heat exchanger 41 and the air outlet 111. Thus, it can be ensured that a distance between the ventilation device 2 and the air outlet 111 is small, and when the ventilation device 2 is in operation, ventilative resistance of the ventilation device 2 can be reduced, to ensure that ventilation quantity of the ventilation device 2 meets the requirements.

In some embodiments, as illustrated in FIG. 8, the first heat exchanger 31 may be provided at a side of the third heat exchanger 41 close to the air inlet 121. That is to say, the first heat exchanger 31 is provided between the third heat exchanger 41 and the air inlet 121. Thus, it can be ensured that a distance between the first heat exchanger 31 and the air inlet 121 is small, and when the air conditioner 100 does not have the ventilation device 2, or the ventilation device 2 does not operate, the heat release device 31 provided close to the air inlet 121 can also release heat better through the air inlet 121, to improve operational reliability of the compressor system 3.

In some embodiments, as illustrated in FIG. 7, inside the housing 1 there may be an upper accommodation space 14 and a lower accommodation space 15. At least one of the first heat exchanger 31 or the third heat exchanger 41 is located in the upper accommodation space 14 (referring to FIG. 9), and at least one of the second heat exchanger 32 or the energy storage device 42 is located in the lower accommodation space 15. Thus, overall layout of the air conditioner 100 is coordinated, upper and lower spaces are reasonably utilized, top-heavy and unstable problem is avoided, and it can be stably supported on the ground or travel on the ground.

As illustrated in FIG. 7, inside the housing 1 there may also be an intermediate accommodation space 16 located between the upper accommodation space 14 and the lower accommodation space 15, and the compressor 33 is located in the intermediate accommodation space 16. Thus, the compressor 33 can be conveniently coupled to the first heat exchanger 31 above and the second heat exchanger 32 below, refrigerant transportation pipe is shortened, the costs is reduced, and the leakage problem of the refrigerant is improved, to promote the transportation reliability of the refrigerant and operational reliability of the compressor system 3.

Additionally, by providing the compressor 33 below the third heat exchanger 41, it is ensured that the third heat exchanger 41 placed in the upper accommodation space 14 has a relatively high level, and the cold air after exchange with the third heat exchanger 41 is prevented from reaching the ground rapidly, i.e., extending blowing distance and time of the cold air, to better reduce the environmental temperature and improve the user experience. Furthermore, by providing the compressor 33 below the third heat exchanger 41, center of the gravity of the whole machine may be lowered and the vibration of the whole machine may be reduced, to make the air conditioner 100 operate more stably.

As illustrated in FIG. 7, inside the housing 1 may also be an intermediate accommodation space 16 located between the upper accommodation space 14 and the lower accommodation space 15, and the liquid pump device 43 is located in the intermediate accommodation space 16. Thus, the liquid pump device 43 may be more conveniently coupled to the third heat exchanger 41 above and the energy storage device 42 below, refrigerant transportation pipe is shortened, the costs is reduced, and the leakage problem of the refrigerant is improved, to promote the transportation reliability of the refrigerant and operational reliability of the liquid pump system 4.

In some embodiments, as illustrated in FIGS. 5 and 6, the housing 1 may include a front surface 11 and a rear surface 12 opposite in a front-rear direction, the air outlet 111 may be formed at the front surface 11, the air inlet 121 may be formed at the rear surface 12, and the air passage 13 is formed in the housing 1 and communicates the air inlet 121 with the air outlet 111. Thus, the processing is convenient, and a distance between the air outlet 111 and the air inlet 121 may be increased to avoid return air short circuit. Certainly, the present application is not limited to this, the air outlet 111 and the air inlet 121 may also be provided in other positions of the housing 1, e.g., a top wall, a side wall, etc., which may be designed flexibly.

Figure 9:
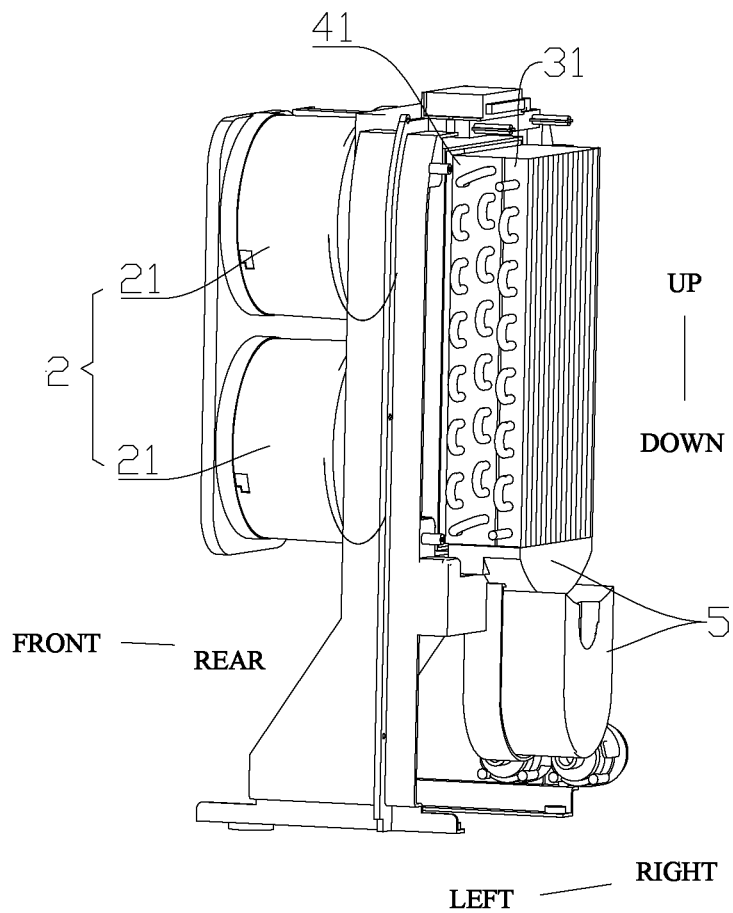
FIG. 9 is an assembly view of a ventilation device, a first heat exchanger, a third heat exchanger, a water collection device, etc. according to an embodiment of the present application.

As illustrated in FIGS. 8 and 9, the ventilation device 2, the third heat exchanger 41, the first heat exchanger 31 are arranged sequentially from front to rear, and it can be ensured that the ventilation device 2 and the third heat exchanger 41 are both close to the air outlet 111, and the first heat exchanger 31 is close to the air inlet 121. Thus, (1) it can be ensured that a distance between the third heat exchanger 41 and the air outlet 111 is small, and when the liquid pump system 4 is in operation, the cold release effect of the third heat exchanger 41 can be improved to better reduce the environmental temperature; (2) it can be ensured that the distance between the ventilation device 2 and the air outlet 111 is small, and when the ventilation device 2 is in operation, ventilative resistance of the ventilation device 2 can be reduce, to ensure that ventilation quantity of the ventilation device 2 meets the requirements; (3) it can be ensured that a distance between the first heat exchanger 31 and the air inlet 121 is small and when the air conditioner 100 does not have the ventilation device 2, or the ventilation device 2 does not operate, the heat release device 31 provided close to the air inlet 121 can also release heat better through the air inlet 121, to improve operational reliability of the compressor system 3.

In some embodiments, as illustrated in FIG. 9, the ventilation device 2 may include a plurality of fan assemblies 21 spaced apart in an up-down direction. Thus, ventilation effect can be promoted, the speed of heat exchange of the first heat exchanger 31 and the third heat exchanger 41 can be quickened, to increase the speed of heat release or cold release of the air conditioner 100. Certainly, the present application is not limited to this, the ventilation device 2 may include only one fan assembly 21, or include two or more fan assemblies 21. Additionally, the number and type of the fans included in each fan assembly 21 is not limited and can be specifically selected according to actual requirements.

As illustrated in FIGS. 8 and 9, thickness directions of the third heat exchanger 41 and the first heat exchanger 31 may each be the flow direction of the airflow in the air passage 13 (such as a direction from rear to front illustrated in FIG. 8), and the third heat exchanger 41 and the first heat exchanger 31 may be provided side by side, to save space and have high energy exchange efficiency. The third heat exchanger 41 and the first heat exchanger 31 may share fins, to simplify assembly and positioning and have high energy exchange efficiency. The third heat exchanger 41 and the first heat exchanger 31 may also not share fins, to have flexible assembly and production.

As illustrated in FIG. 9, in some embodiments of the present application, thickness directions of the third heat exchanger 41 and the first heat exchanger 31 are each the front-rear direction, and the third heat exchanger 41 and the first heat exchanger 31 are provided side by side in the front-rear direction. That is to say, a center of the third heat exchanger 41 and a center of the first heat exchanger 31 are located on a horizontal line extending in the front-rear direction, and the third heat exchanger 41 and the first heat exchanger 31 have flush upper end faces, flush lower end faces, flush left end faces and flush right end faces. Thus, the installation is convenient and the space is saved.

Moreover, when the third heat exchanger 41 performs cold release operation, the third heat exchanger 41 may transfer cold to the first heat exchanger 31, to make the first heat exchanger 31 a cold exchange body with a low temperature and increase speed of cold release. When the first heat exchanger 31 performs heat release operation, the first heat exchanger 31 may transfer heat to the third heat exchanger 41, to make the third heat exchanger 41 a heat exchange body with a high temperature and increase speed of heat release. Additionally, as illustrated in FIG. 9, in the present embodiment, the number of rows of refrigerant tubes in the third heat exchanger 41 may be greater than that of rows of refrigerant tubes in the first heat exchanger 31. Thus, the cold release effect of the third heat exchanger 41 can be promoted, to increase cooling speed.

Hereinafter, a water collection device 5 and a water pumping device 7 according to some embodiments of the present application will be described.

In some embodiments, as illustrated in FIG. 9, the air conditioner 100 may also include a water collection device 5, and the water collection device 5 is configured to collect condensate water dripped from the third heat exchanger 41. That is to say, when the third heat exchanger 41 performs the cold release operation, the condensate water condensed on a surface of the third heat exchanger 41 due to cold and heat exchange and dripped along the surface of the third heat exchanger 41 can be recycled by the water collection device 5. Thus, circuit burnout due to water accumulated in the air conditioner 100 can be avoided, to enhance the operational reliability of the air conditioner 100.

Figure 10:
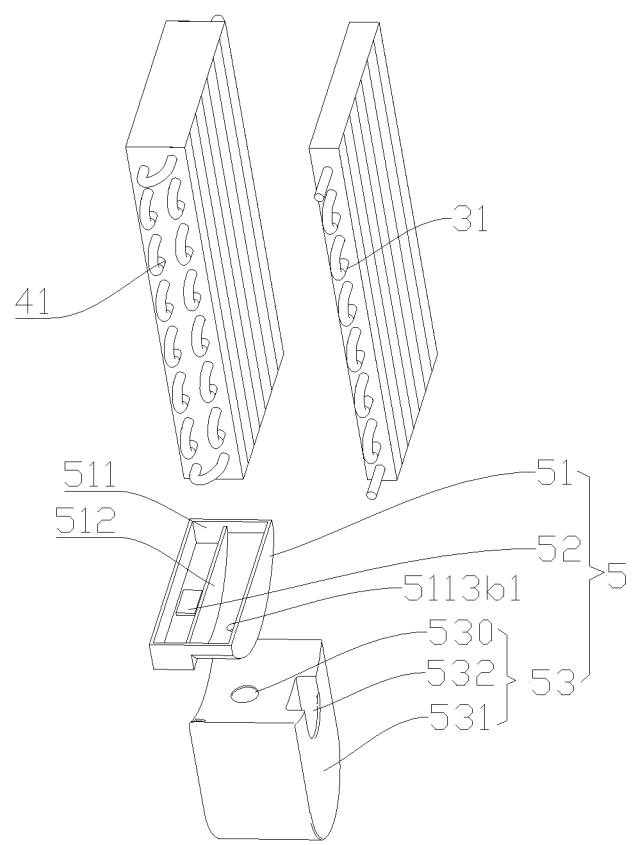
FIG. 10 is an exploded view of a first heat exchanger, a third heat exchanger, and a water collection device according to an embodiment of the present application.

In some embodiments of the present application, as illustrated in FIGS. 9 and 10, the water collection device 5 may include a water collection pan 51 and an atomizer 52, the water collection pan 51 is configured to collect the condensate water dripped from the third heat exchanger 41, and the atomizer 52 is provided in the water collection pan 51 and configured to atomize the water in the water collection pan 51. Thus, the recycled condensate water can be utilized to humidify the air, and the air conditioner 100 can further have humidification function which is powerful. Moreover, since the condensate water is recycled, the user can be prevented from draining the condensate water in the water collection device 5 on his or her own initiative, or the number of times that the user regularly drains the condensate water in the water collection device 5 can be reduced, to relieve labour intensity of the user.

It could be understood that, water droplets atomized by the atomizer 52 is discharged from the air outlet with the cold air in the air passage 13, to realize humidification effect. Additionally, it could be understood that, specific structure and work principle of the atomizer 52 are well known by those skilled in the art, and will not elaborated herein.

Herein, it should be noted that, water collection device 5 may directly or indirectly collect the condensate water dripped along the surface of the third heat exchanger 41.

Specifically, when the water collection device 5 is placed right below the third heat exchanger 41, the water collection device 5 may directly collect the condensate water dripped along the surface of the third heat exchanger 41. As a specific example illustrated in FIG. 11, at least part of the water collection pan 51 may be located right below the third heat exchanger 41. Thus, the water collection pan 51 can directly collect the condensate water dripped from the third heat exchanger 41, to simplify the structure and reduce the costs.

Additionally, the water collection device 5 may also indirectly collect the condensate water dripped along the surface of the third heat exchanger 41 by other auxiliary manners, and in this case the water collection device 5 may not be placed right below the third heat exchanger 41. As a specific example illustrated in FIG. 12, a bottom of the third heat exchanger 41 is provided with a sump 411, and the sump 411 is coupled to the water collection pan 51 through a drain tube 412. Thus, condensate water dripped from the third heat exchanger 41 can be collected in the sump 411, and then flow into the water collection pan 51 through the drain tube 412. Thus, it is not necessary to provide the water collection pan 51 right below the third heat exchanger 41. The present application is not limited to this, when the solution that the drain tube 412 guides the water to the water collection pan 51 is employed, the water collection pan 51 may be certainly provided right below the third heat exchanger 41, to save transverse space occupancy.

Figure 11:
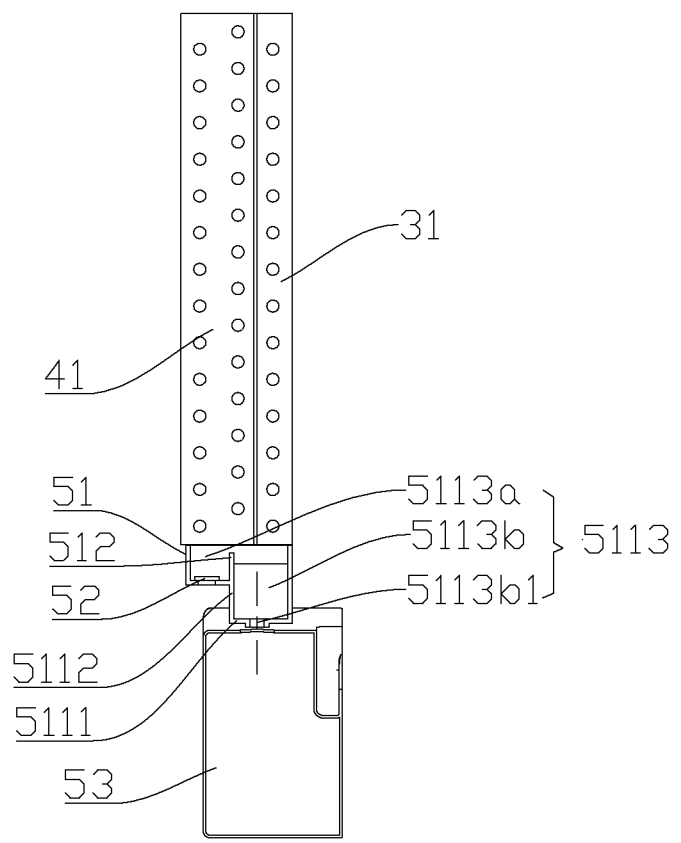
FIG. 11 is an assembly view of a first heat exchanger, a third heat exchanger, and a water collection device according to an embodiment of the present application.

In some embodiments, as illustrated in FIGS. 10 and 11, the water collection pan 51 may include a body 511 and a partition plate 512. The body 511 includes a bottom wall 5111 and a side wall 5112, and a chamber 5113 with an open top is formed between the bottom wall 5111 and the side wall 5112. The partition plate 512 is provided in the chamber 5113, to divide the chamber 5113 into an atomization chamber 5113a and an overflow chamber 5113b located at two sides of the partition plate 512.

As illustrated in FIGS. 10 and 11, the atomization chamber 5113a is located right below the third heat exchanger 41, the atomizer 52 is located in the atomization chamber 5113a, and the water collection pan 51 is configured to render the water in the atomization chamber 5113a to overflow into the overflow chamber 5113b when water level in the atomization chamber 5113a exceeds a preset value. Thus, it can be ensured that level of the condensate water in the atomization chamber 5113a is enough to guarantee operational effectiveness of the atomizer 52, and meanwhile it can avoid risks of electrical leakage, etc. resulting from overflow due to excessively high level of the water in the atomization chamber 5113a.

In some specific examples, as illustrated in FIGS. 10 and 11, an upper end of the partition plate 512 may be lower than an upper edge of the side wall 5112. In this way, when the water level in the atomization chamber 5113a is higher than the upper end of the partition plate 512, i.e., exceeding the above-mentioned preset value, the water in the atomization chamber 5113a in this case can cross the upper end of the partition plate 512 and overflow into the overflow chamber 5113b. Thus, the overflow can realized simply, effectively and fast. Certainly, the present application is not limited to this, and the overflow can also be realized by other manners. For example, the partition plate 512 may further include an overflow hole, and the water in the atomization chamber 5113a can overflow into the overflow chamber 5113b through the overflow hole in the partition plate 512 when the water level in the atomization chamber 5113a exceeds the preset value, which is not elaborated herein.

In some embodiments of the present application, as illustrated in FIGS. 10 and 11, the water collection device 5 may further include a water receiver 53, and the water receiver 53 is in communication with the overflow chamber 5113b. Thus, it can avoid overflow of the water in the overflow chamber 5113b. For example, a box with large volume may be provided to serve as the water receiver 53 to guarantee reliability of recycling of the condensate water; and in this case the overflow chamber 5113b may have a small volume, as long as it can function to guide water from the atomization chamber 5113a to the water receiver 53.

It should be noted that, the communication manner of the water receiver 53 and the overflow chamber 5113b is not limited. For example, bottom of the overflow chamber 5113b may include a drain hole 5113b1, a top of the water receiver 53 may include a water inlet 530, the water receiver 53 is located below the water collection pan 51, and the overflow chamber 5113b discharges water into the water inlet 530 of the water receiver 53 through the drain hole 5113b1. Thus, communication of the water receiver 53 and the overflow chamber 5113b can be realized simply and effectively. Certainly, the present application is not limited to this, communication of the water receiver 53 and the overflow chamber 5113b may also be realized by an externally coupled conduit. Additionally, the drain hole 5113b1 is also not limited to be formed at the bottom of the overflow chamber 5113b. For example, the drain hole 5113b1 may also be located in a middle or upper middle of the overflow chamber 5113b, which is not elaborated herein.

Figure 13:
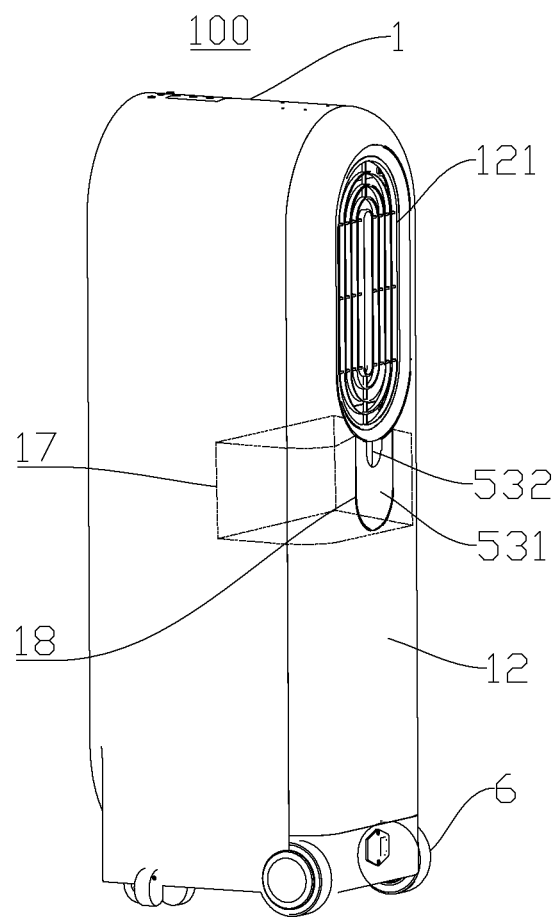
FIG. 13 is a perspective view of an air conditioner according to an embodiment of the present application.

When water collection device 5 includes the water receiver 53, as illustrated in FIG. 13, inside the housing 1 of the air conditioner 100 there may further be an installation cavity 17, the installation cavity 17 includes an accessing opening 18 formed at an outer surface of the housing 1, and the water receiver 53 is removably received in the installation cavity 17 via the accessing opening 18. Thus, when it needs to pour away the water in the water receiver 53, the water receiver 53 may be removed from the accessing opening 18, and after the water is poured away, the water receiver 53 may be placed back into the installation cavity 17 from the accessing opening 18, to continue to recycle the condensate water, or to avoid missing of the water receiver 53, realizing reception of the water receiver 53 and recycling of the condensate water.

In addition, as illustrated in FIGS. 10 and 13, the water receiver 53 may further include a transparent side plate 531. When the water receiver 53 is received in the installation cavity 17, the transparent side plate 531 fills the accessing opening 18 to make it visible from the outside. Thus, the user can observe state of the water level in the water receiver 53 through the transparent side plate 531, and the water can be poured away when the water level in the water receiver 53 is relatively high, to reduce the number of times that the user pours way the water, and to reduce labour intensity of the user. Certainly, the present application is not limited to this, the housing 1 may also be provided with a door for opening and closing the accessing opening 18, to cover the transparent side plate 531 duly and to prevent the transparent side plate 531 from damage. In addition, as illustrated in FIGS. 10 and 13, the transparent side plate 531 may have a handle structure 532, and the user may take the water receiver 531 conveniently.

Figure 12:
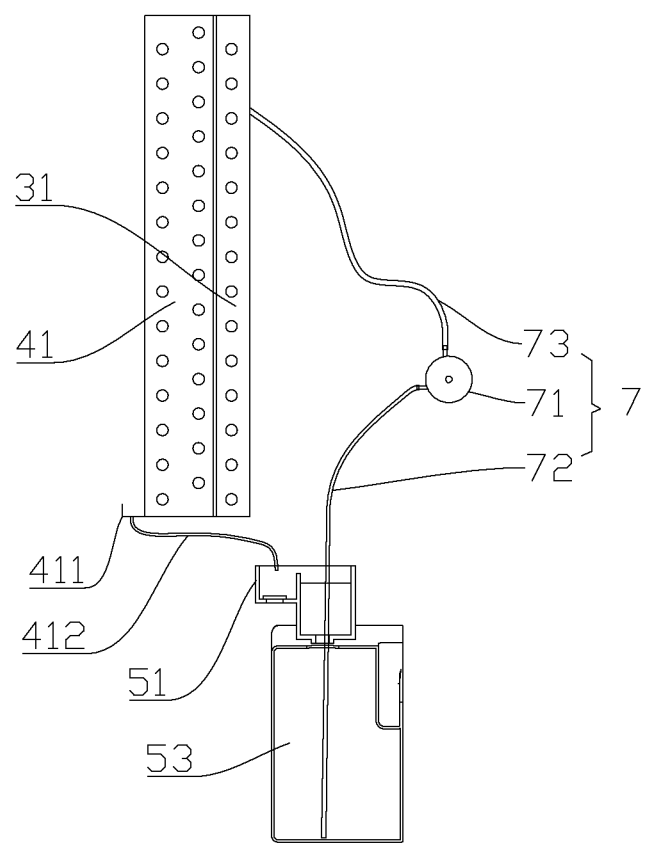
FIG. 12 is an assembly view of a first heat exchanger, a third heat exchanger, a water collection device and a water pumping device according to an embodiment of the present application.

Certainly, the present application is not limited to this, the water in the water receiver 53 may not be poured away by the user. For example, in some embodiments of the present application, as illustrated in FIG. 12, the air conditioner 100 according to embodiments of the present application may further include a water pumping device 7, and the water pumping device 7 is configured to pump the condensate water collected in the water collection device 5 to the first heat exchanger 31. Thus, when the first heat exchanger 31 is in operation, the water pumping device 7 can be started, and pump the condensate water collected in the water collection device 5 to the first heat exchanger 31, to speed up the heat release of the first heat exchanger 31, and further to speed up the refrigeration of the second heat exchanger 32.

In some embodiments, as illustrated in FIG. 12, the water pumping device 7 includes a second pump 71, a first flexible tube 72 and a second flexible tube 73. The second pump 71 pumps the condensate water from the water collection device 5 through the first flexible tube 72, and the second pump 71 supplies the condensate water to the first heat exchanger 31 through the second flexible tube 73. Thus, by employing the first flexible tube 71 and the second flexible tube 73 rather than rigid pipes, installation flexibility of the second pump 71 is improved and thus the second pump 71 may be disposed in an appropriate position according to needs, to reduce assembly difficulty of the whole air conditioner 100 and promote assembly efficiency of the whole air conditioner 100.

Coupling manner of the first flexible tube 72 and the second pump 71 is not limited. For example, they may be coupled by ultrasonic welding, to improve coupling reliability; as another example, they may be also fixedly coupled by a circlip 44, that is, an end of the first flexible tube 72 is fitted over a connector of the second pump 71, and then the circlip 44 is fitted over the end of the first flexible tube 72 to realize the fastening, reduce assembly difficulty and promote assembly efficiency.

Coupling manner of the second flexible tube 73 and the second pump 71 is not limited. For example, they may be coupled by ultrasonic welding, to improve coupling reliability; as another example, they may be also fixedly coupled by a circlip 44, that is, an end of the second flexible tube 73 is fitted over a connector of the second pump 71, and then the circlip 44 is fitted over the end of the second flexible tube 73 to realize the fastening, reduce assembly difficulty and promote assembly efficiency.

In some embodiments, as illustrated in FIG. 3, the air conditioner 100 also includes a housing 1, and inside the housing 1 there are an upper accommodation space 14, a lower accommodation space 15, and an intermediate accommodation space 16 located between the upper accommodation space 14 and the lower accommodation space 15. The first heat exchanger 31 and the third heat exchanger 41 are both located in the upper accommodation space 14, the second heat exchanger 32 and the energy storage device 42 are both located in the lower accommodation space 15, and the water pumping device 7 and the water collection device 5 are located in the intermediate accommodation space 16. Thus, the water pumping device 7 can be coupled to the water collection device 5 and the first heat exchanger 31 above more conveniently, condensate water transportation pipe (i.e., the first flexible tube 72 and the second flexible tube 73) can be shortened, to reduce the costs and energy consumption of the water pumping, improve transportation efficiency of the condensate water, and promote heat release efficiency of the first heat exchanger 31.

Hereinafter, a wheel device 6 according to some embodiments of the present application is described.

In some embodiments, as illustrated in FIG. 13, the air conditioner 100 according to embodiments of the present application may further include a wheel device 6. The wheel device 6 is installed to the bottom of the housing 1 and supports the housing 1 to move on the ground. Thus, the air conditioner 100 may be a portable air conditioner, facilitating applications. Additionally, it should be noted that, the number and the distribution manner of the wheels included by the wheel device 6 according to embodiments of the present application as well as the assembly manner of the wheels and the housing 1 are all well known by those skilled in the art, and thus will not be elaborated.

An energy storage device 42 of the air conditioner 100 according to embodiments of the present application is described with reference to FIGS. 15 to 22 below.

As illustrated in FIGS. 15 to 21, the energy storage device 42 of the air conditioner 100 according to embodiments of the present application further includes an upper fixation member 711 and a lower positioning member 712. Inside the storage container 421 there is a containing chamber 703, and the containing chamber 703 internally contains energy storage medium 4a. Specifically, the storage container 421 includes a casing 701 and a top cover 702, a containing chamber 703 with an open top is formed in the casing 701, and the top cover 702 is provided to the casing 701 to close the containing chamber 703.

The second heat exchanger 32, the fourth heat exchanger 422, the upper fixation member 711 and the lower positioning member 712 may constitute a heat exchange assembly 710. The second heat exchanger 32 and the fourth heat exchanger 422 are separately provided in the energy storage medium 4a, the energy storage medium 4a may receive energy from the second heat exchanger 32 and store the energy, and the energy storage medium 4a may exchange heat with the coolant 4b in the fourth heat exchanger 422. It should be noted that, the second heat exchanger 32 internally contains the refrigerant, and the refrigerant in the second heat exchanger 32 can cool or heat the energy storage medium 4a. It could be understood that, when the fourth heat exchanger 422 and the second heat exchanger 32 are placed in contact with each other, the fourth heat exchanger 422 may also receive energy from the second heat exchanger 32 directly.

The coolant 4b exchanges heat with the energy storage medium 4a. That is to say, the energy storage medium 4a receives energy (i.e., heat or cold) from the second heat exchanger 32 and stores the energy, and may give energy to the coolant 4b by heat exchange, and the coolant 4b carries and delivers the energy. In this way, the coolant 4b can transfer the energy in the energy storage medium 4a. For example, when the cold is stored in the energy storage medium 4a, the coolant 4b absorbs the cold from the energy storage medium 4a and transfers it. As another example, when heat is stored in the energy storage medium 4a, the coolant 4b absorbs the heat from the energy storage medium 4a and transfers it.

Specifically, specific type of the energy storage medium 4a is not limited. For example, it may be water, etc. When the second heat exchanger 32 renders the energy storage medium 4a to store cold, the water can be iced, to better store the cold, which is cost-effective and has good effect of storing and getting cold. Moreover, specific type of the coolant 4b is also not limited. For example, it may be alcohol solution, such as methanol, ethylene glycol, glycerol or low-carbon alcohol hydrate, etc., to improve effect of getting and releasing cold. However, it should be noted that, the energy storage medium 4a and the coolant 4b are not specifically limited, as long as a freezing point of the coolant 4b is lower than a cold storage temperature of the energy storage medium 4a, and the coolant 4b is ensured to circulate without freezing.

The upper fixation member 711 is provided to up portions of the second heat exchanger 32 and the fourth heat exchanger 422, and the upper fixation member 711 is fixed to the storage container 421, and the lower positioning member 712 is fixed to lower portions of the second heat exchanger 32 and the fourth heat exchanger 422 and the lower positioning member 712 is positioned on a bottom wall of the containing chamber 703. Optionally, the lower positioning member 712 is a plastic member, to prevent rust and facilitate installation. Optionally, the upper fixation member 711 may employ aluminum or stainless steel, thus damage to the upper fixation member 711 will not occur when welding the refrigerant tube 713.

Specifically, the upper portions of the second heat exchanger 32 and the fourth heat exchanger 422 are provided with the upper fixation member 711, the lower portions of the second heat exchanger 32 and the fourth heat exchanger 422 are provided with the lower positioning member 712, the upper fixation member 711 is fixed to the casing 701, and the lower positioning member 712 is positioned and installed on the bottom wall of the containing chamber 703. In the process of installation, the lower positioning member 712 may be used to be positioned in the containing chamber 703, and then the upper fixation member 711 is fixed to the casing 701.

In the energy storage device 42 according to embodiments of the present application, by employing the manner of positioning installation of the lower positioning member 712 and fixing installation of the upper fixation member 711, the second heat exchanger 32 and the fourth heat exchanger 422 are fixed in the containing chamber 703, this facilitates assembly of the second heat exchanger 32 and the fourth heat exchanger 422, ensures firmness of the assembly of the second heat exchanger 32 and the fourth heat exchanger 422, prevents falling-off of the second heat exchanger 32 and the fourth heat exchanger 422 from the containing chamber 703, and guarantees cooling/heating, energy storage effect of the energy storage device 42.

In some specific embodiments of the present application, as illustrated in FIGS. 17 to 21, the upper fixation member 711 is fitted over the refrigerant tube 713 of the heat exchange assembly 710, the bottom wall of the containing chamber 703 is provided with a positioning groove 704, and the lower positioning member 712 is inserted in the positioning groove 704. Specifically, when installation, the lower positioning member 712 is inserted into the positioning groove 704, and then the upper fixation member 711 fitted over the refrigerant tube 713 is fixed to the casing 701. Thus, upper and lower limiting manner is used to install the heat exchange assembly 710 in the containing chamber 703, facilitating assembly; and assembly manner between the upper fixation member 711 and the heat exchange assembly 710 is simple. Further, the upper fixation member 711 may be in interference fit with the refrigerant tube 713, to promote fixing reliability. Certainly, it could be understood that, it may be possible that the bottom wall of the containing chamber 703 is provided with a positioning post, a bottom of the lower positioning member 712 is provided with a positioning groove, and the positioning post extends into the positioning groove to realize the positioning installation of the lower positioning member 712.

Figure 17:
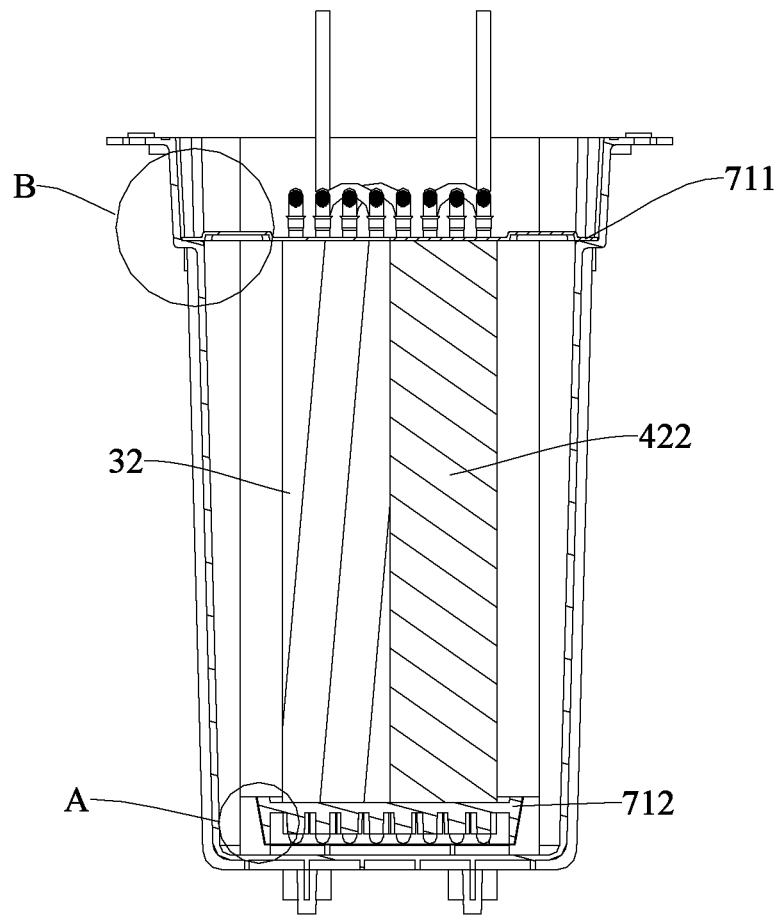
FIG. 17 is a partially cross-sectional view of an energy storage device according to an embodiment of the present application.
Figure 18:
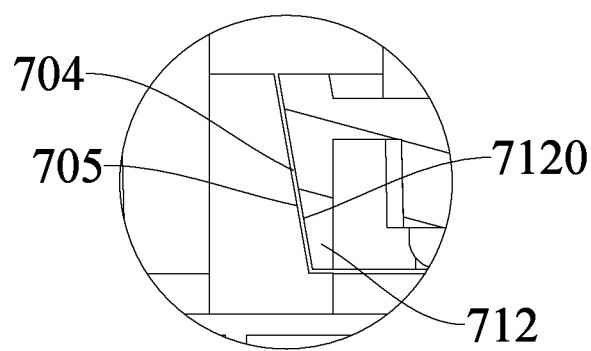
FIG. 18 is an enlarged view of portion A in FIG. 17.

As illustrated in FIGS. 17 and 18, according to some embodiments of the present application, at least a group of opposite side walls of the positioning groove 704 extend obliquely downwards towards each other to form first guide faces 705, at least a group of opposite side walls of the lower positioning member 712 extend obliquely downwards towards each other to form second guide faces 7120, and the first guide faces 705 and the second guide faces 7120 are fitted in one-to-one correspondence. That is to say, the positioning groove 704 is at least provided with two opposite first guide faces 705, and the two opposite first guide faces 705 extend downwards obliquely towards each other. That is to say, cross sectional area of the positioning groove 704 decreases gradually in a downward direction. The lower positioning member 712 is at least provided with two opposite second guide faces 7120, and the two opposite second guide faces 7120 extend downwards obliquely towards each other. Thus, the first guide faces 705 and the second guide faces 7120 have an effect of guiding the installation, and by the fitting of the first guide faces 705 and the second guide faces 7120, the lower positioning member 712 can be conveniently inserted into the positioning groove 704.

It could be understood that, each side wall of the positioning groove 704 may form a first guide face 705, each first guide face 705 extends downwards obliquely towards a center of the positioning groove 704, and each outer circumferential wall of the lower positioning member 712 may also form a second guide face 7120. Optionally, an oblique angle of the first guide face 705 may be 3°-10°, an oblique angle of the second guide face 7120 may be 3°-10°, the oblique angle of first guide face 705 and the oblique angle of the second guide face 7120 may be the same or different.

Figure 19:
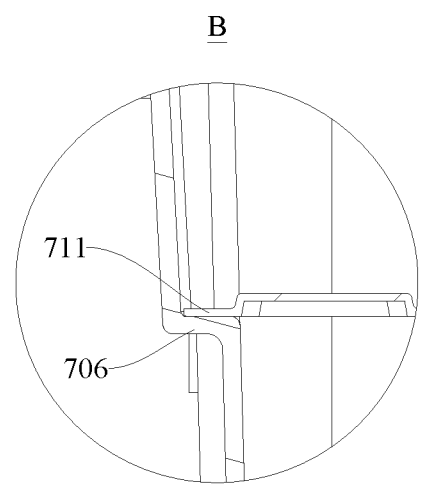
FIG. 19 is an enlarged view of portion B in FIG. 17.
Figure 20:
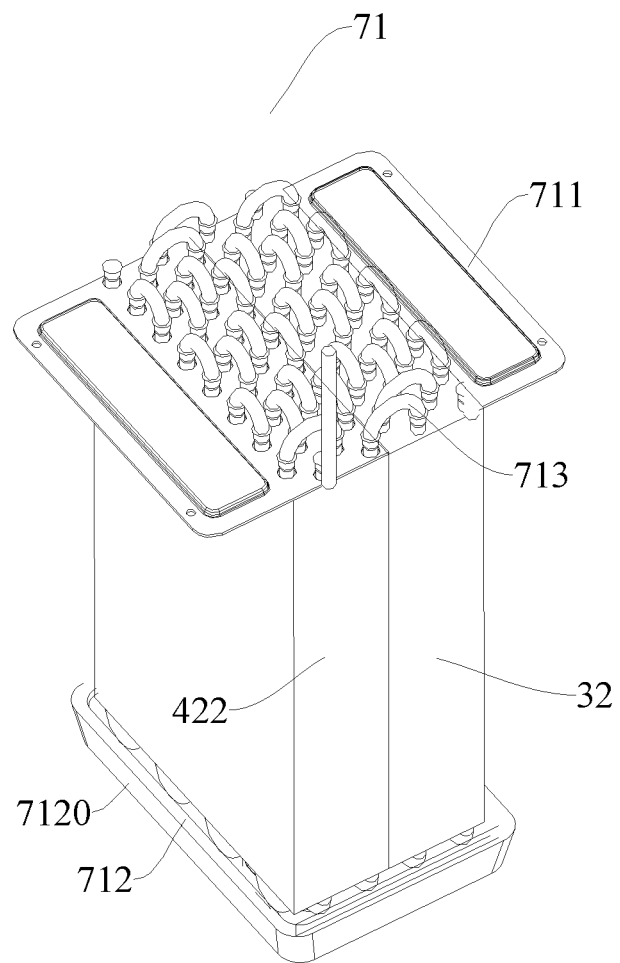
FIG. 20 is a schematic view of a heat exchange assembly according to an embodiment of the present application.

As illustrated in FIGS. 17 and 19, in some specific embodiments of the present application, an inner wall of the containing chamber 703 is provided with a fixation protrusion 706, and the upper fixation member 711 is fixed on an upper surface of the fixation protrusion 706, to facilitate fixing installation of the upper fixation member 711. Specifically, the fixation protrusion 706 includes a first fixation hole, the upper fixation member 711 includes a second fixation hole, and a fixation coupling member passes through the second fixation hole and is fixed in the first fixation hole, to facilitate installation of the upper fixation member 711 on the fixation protrusion 706. Optionally, the fixation coupling member may be a rivet, a screw, etc.

Preferably, the containing chamber 703 is provided with a plurality of fixation protrusions 706, the plurality of fixation protrusions 706 are distributed on opposite side walls of the containing chamber 703, and the upper fixation member 711 is fixed on the plurality of fixation protrusions 706, to ensure that the heat exchange assembly 710 may be positioned in the storage container 421, and to improve fixing reliability of the heat exchange assembly 710.

Figure 21:
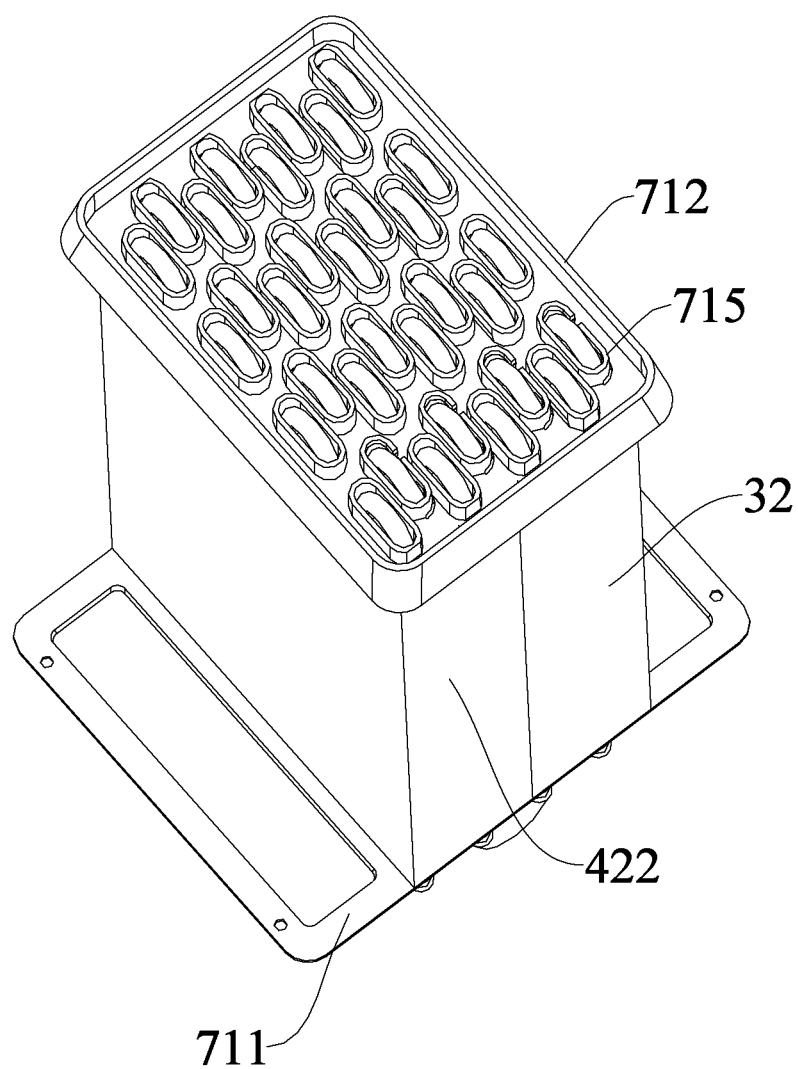
FIG. 21 is a schematic view of a heat exchange assembly according to an embodiment of the present application from another angle.
Figure 22:
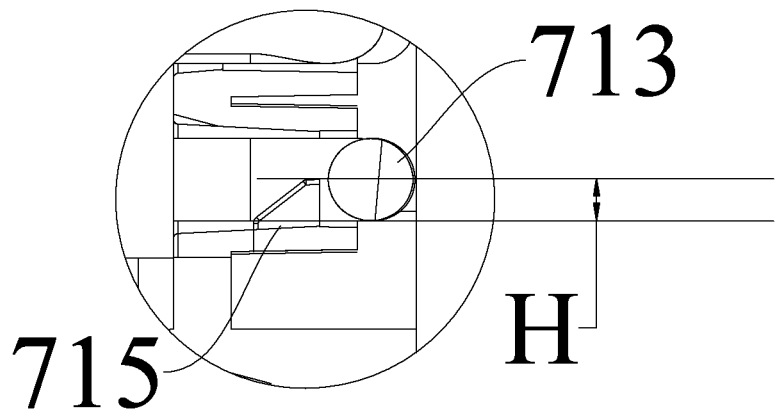
FIG. 22 is a schematic view showing fitting between a sleeve member and a refrigerant tube according to an embodiment of the present application.
Figure 23:
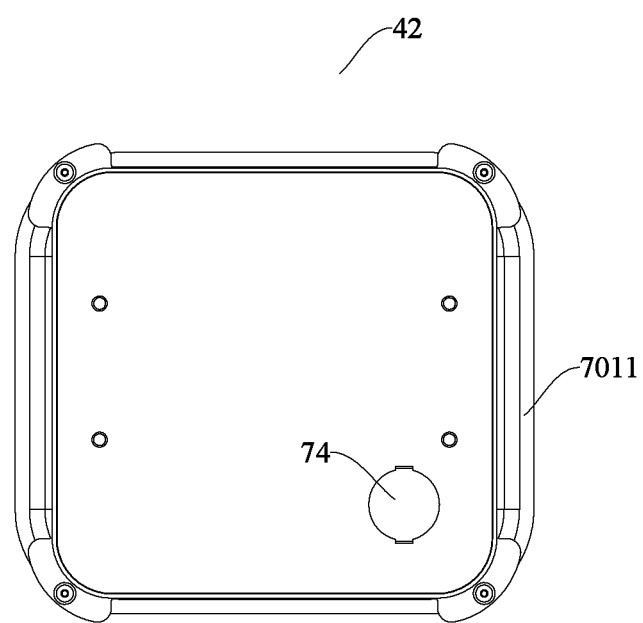
FIG. 23 is a top view of an energy storage device according to an embodiment of the present application.

As illustrated in FIGS. 21 and 22, in some embodiments of the present application, each of the second heat exchanger 32 and the fourth heat exchanger 422 is provided with the refrigerant tube 713, the lower positioning member 712 is provided with sleeve members 715, and the sleeve members 715 are fitted over the refrigerant tubes 713 and in contact with the refrigerant tubes 713 to position the lower positioning member 712 on the second heat exchanger 32 and the fourth heat exchanger 422. That is to say, contact friction between the sleeve members 715 and the refrigerant tubes 713 is used to fix the lower positioning member 712 on the second heat exchanger 32 and the fourth heat exchanger 422, screw fixing structure may be canceled, to facilitate installation of the lower positioning member 712. As illustrated in FIG. 22, specifically, a width of the sleeve member 715 is 2H, an outer diameter of the refrigerant tube 713 is D, and value range of H is ($\frac{1}{2}$~$\frac{1}{4}$)D, to ensure that the sleeve member 715 can be in tightly contact with the refrigerant tube 713. Optionally, the sleeve members 715 and the lower positioning member 712 may be an integrally formed member.

Figure 16:
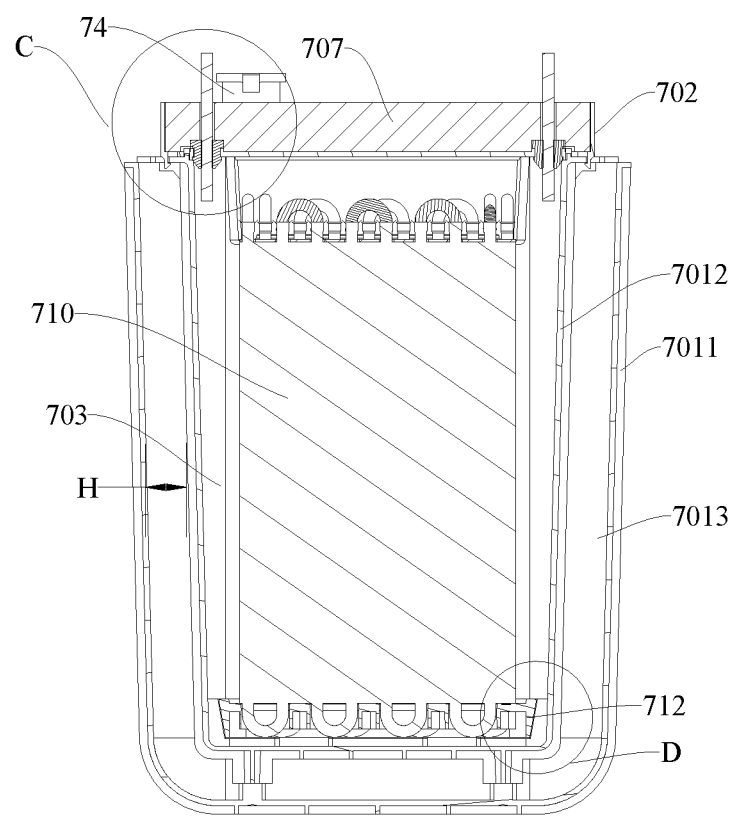
FIG. 16 is a cross-sectional view of an energy storage device according to an embodiment of the present application.

In some embodiments of the present application, as illustrated in FIG. 16, the casing 701 includes an outer casing 7011 and an inner casing 7012. The outer casing 7011 has an open top, the inner casing 7012 has an open top, and the inner casing 7012 is provided in the outer casing 7011. A circumferential wall insulation layer 7013 is provided between the inner casing 7012 and the outer casing 7011, and the containing chamber 703 is provided in the inner casing 7012. Thus, by providing the circumferential wall insulation layer 7013, thermal insulation effect of the casing 701 can be improved, and cold leakage can be avoided. Optionally, the circumferential wall insulation layer 7013 may be urethane material, and filled between the outer casing 7011 and the inner casing 7012 by foaming process. Optionally, a thickness H of the circumferential wall insulation layer 7013 satisfies H≥25 mm, to ensure thermal insulation effect of the casing 701.

Specifically, as illustrated in FIG. 16, the storage container 421 also includes a top insulation layer 707, and the top insulation layer 707 is provided on the top cover 702, to further improve thermal insulation effect of the storage container 421, and avoid cold leakage.

As illustrated in FIGS. 1 and 15-22, the air conditioner 100 according to embodiments of the present application includes a housing 1, a ventilation device (not illustrated), a first heat exchanger 31, a compressor 33, an energy storage device 42, a third heat exchanger 41 and a liquid pump device 43. The housing 1 includes an air inlet, an air outlet, and an air passage communicating the air inlet with the air outlet. The ventilation device is provided in the housing 1 and configured to cause the air passage to suck in airflow from the air inlet, and discharge the airflow from the air outlet. Specifically, the air conditioner 100 may be a portable air conditioner.

The energy storage device 42 is an energy storage device 42 according to the above embodiments of the present application, and the compressor 33 is coupled between the first heat exchanger 31 and the second heat exchanger 32. It could be understood that, a throttle element 34 is also provided between the first heat exchanger 31 and the second heat exchanger 32. Refrigerant flow path formed among the compressor 33, the first heat exchanger 31, the second heat exchanger 32 and the throttle element 34 is a compressor system. The compressor system may be used for cooling or heating. When the compressor system has cooling and heating functions at the same time, the compressor system further includes a four-way valve. It should be noted that, when the compressor system performs cooling or heating, the cooling principle and heating principle are existing technologies, and will not be elaborated herein.

The liquid pump device 43 is coupled between the third heat exchanger 41 and the fourth heat exchanger 422 to circulate the coolant 4b between the third heat exchanger 41 and the fourth heat exchanger 422, and the third heat exchanger 41 is provided in the air passage.

Specifically, the containing chamber 703 of the storage container 421 contains energy storage medium 4a, the storage container 421 is also internally provided with the fourth heat exchanger 422, the fourth heat exchanger 422 and the second heat exchanger 32 are separately provided in the energy storage medium 4a, and the second heat exchanger 32 cools or heats the energy storage medium 4a.

A liquid pump system is formed among the fourth heat exchanger 422, the third heat exchanger 41 and the liquid pump device 43, the liquid pump device 43 is coupled to the fourth heat exchanger 422, and the third heat exchanger 41 is coupled to the fourth heat exchanger 422. Under the liquid pump device 43, the coolant 4b is circulated between the fourth heat exchanger 422 and the third heat exchanger 41. The coolant 4b flows through the fourth heat exchanger 422 to be cooled or heated by heat exchange with the energy storage medium 4a, the cooled or heated coolant 4b flows to the third heat exchanger 41 under the action of the liquid pump device 43, and the third heat exchanger 41 discharges the energy of the coolant 4b to the indoor environment through the air passage, to realize temperature adjustment of the indoor environment.

In the air conditioner 100 according to embodiments of the present application, the energy is stored by utilizing energy storage principle, and then the third heat exchanger 41 is used to discharge the energy; when the third heat exchanger 41 is used to discharge cold to the environment, no heat discharge to the environment may be accompanied, thus it is not necessary to provide an exhaust tube, etc., use environment of the air conditioner 100 will not be limited, and use range of the air conditioner can be expanded.

In some specific embodiments of the present application, the compressor system in the air conditioner 100 may be similar to a refrigeration system in a refrigerator, to make the energy storage medium 4a into ice; furthermore, the liquid pump system can substitute a refrigeration system in a portable air conditioner, and utilize the energy storage medium 4a to get cold from the second heat exchanger 32 in the compressor system 3 and store the cold, and release the cold to the environment through the coolant 4b and the third heat exchanger 41, to reduce the environmental temperature. In this way, during operation of the liquid pump system, the coolant 4b exchanges heat with the energy storage medium 4a to release heat to the energy storage medium 4a, thus, the liquid pump system can omit an exhaust tube or the like for discharging hot air compared to a refrigeration system of the portable air conditioner in the related art, and the air conditioner 100 can be moved arbitrarily.

An energy storage device 42 of the air conditioner according to some embodiments of the present application will be described below with reference to FIGS. 1, 15-16, and 23-26.

As illustrated in FIGS. 15-16, and 23-26, the energy storage device 42 of the air conditioner according to embodiments of the present application includes a storage container 421. The storage container 421 includes an outer casing 7011, an inner casing 7012 and a top cover 702. The outer casing 7011 has an open top, the inner casing 7012 has an open top, and the inner casing 7012 is provided in the outer casing 7011. A circumferential wall insulation layer 7013 is provided between the inner casing 7012 and the outer casing 7011, the inner casing 7012 internally contains the energy storage medium, and the top cover 702 is provided on the inner casing 7012 to close the top of the inner casing 7012. Specifically, a containing chamber 703 is provided in the inner casing 7012, and the containing chamber 703 internally contains the energy storage medium, and the top cover 702 is configured to close a top of the containing chamber 703.

The second heat exchanger 32 is provided in the energy storage medium, the energy storage medium may receive energy from the second heat exchanger 32 and store the energy, the second heat exchanger 32 has an inlet tube 7101 and an outlet tube 7102, and the inlet tube 7101 and the outlet tube 7102 separately extend out of the storage container 421. It should be noted that, the air conditioner 100 further include a compressor 33, a first heat exchanger 31 a throttle element 34 and other elements. The second heat exchanger 32 is coupled to the throttle element 34 and the compressor 33 through the inlet tube 7101 and the outlet tube 7102, and a flow path formed by the compressor 33, the second heat exchanger 32, the throttle element 34 and the first heat exchanger 31 is a compressor system. The compressor system may be used for cooling or heating. When the compressor system has cooling and heating functions at the same time, the compressor system further includes a four-way valve. It should be noted that, when the compressor system performs cooling or heating, the cooling principle and heating principle are existing technologies, and will not be elaborated herein.

The fourth heat exchanger 422 is provided in the energy storage medium, the coolant in the fourth heat exchanger 422 exchanges heat with the energy storage medium, the fourth heat exchanger 422 has a liquid reception tube 435 and a liquid outlet tube 434, and the liquid reception tube [433] 435 and the liquid outlet tube 434 separately extend out of the storage container 421.

In the energy storage device 42 of the air conditioner according to embodiments of the present application, by providing the outer casing 7011, the inner casing 7012 and the circumferential wall insulation layer 7013 and locating the circumferential wall insulation layer 7013 between the inner casing 7012 and the outer casing 7011, the circumferential wall insulation layer 7013 may have an thermal insulation effect on the refrigerant in the inner casing 7012, the outer casing 7011 may have a protection effect on the circumferential wall insulation layer 7013, and the outer casing 7011 may also have an thermal insulation effect to some extent. Thus, thermal insulation effect of the storage container 421 can be ensured, the storage container 421 has a simple structure, and after cooling or heating of the second heat exchanger 32 to the energy storage medium, energy storage effect of the energy storage device 42 can be guaranteed.

Optionally, the circumferential wall insulation layer 7013 may be polyurethane material, and filled between the outer casing 7011 and the inner casing 7012 by foaming process. Optionally, a thickness H of the circumferential wall insulation layer 7013 ≥25 mm, to ensure thermal insulation effect of the storage container 421.

In some embodiments of the present application, as illustrated in FIGS. 15-24, the top of the inner casing 7012 is provided with an installation lug 70122, and the installation lug 70122 is fixed to the outer casing 7011 by a screw, to facilitate positioning installation between the inner casing 7012 and the outer casing 7011. Optionally, four installation lugs 70122 are provided, and the four installation lugs 70122 are provided at four corners of the inner casing 7012.

Figure 15:
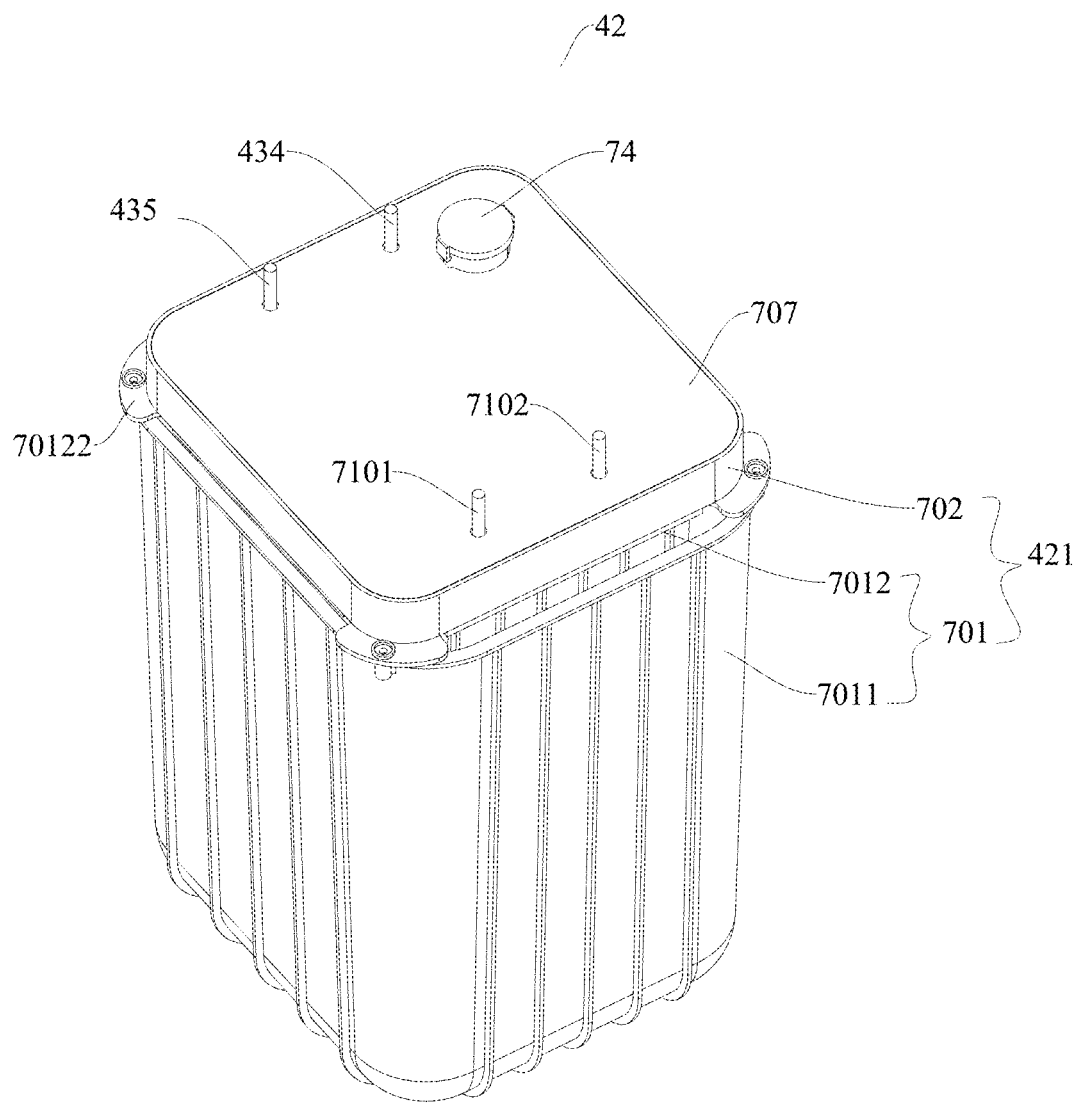
FIG. 15 is a schematic view of an energy storage device according to an embodiment of the present application.

In some embodiments of the present application, as illustrated in FIGS. 15-16, the energy storage device 42 also includes a top insulation layer 707, and the top insulation layer 707 is provided on the top cover 702. By providing the top insulation layer 707, thermal insulation effect of the storage container 421 can be further improved, and the cold leakage can be avoided. Optionally, an accommodation cavity is provided at the top cover 702, and the top insulation layer 707 is provided in the accommodation cavity, to facilitate installation of the top insulation layer 707. Furthermore, a thickness of the top insulation layer 707 may be 25 mm or more, to further improve the thermal insulation effect of the top insulation layer 707. Optionally, the top insulation layer 707 may be EPS or other insulation materials.

Figure 24:
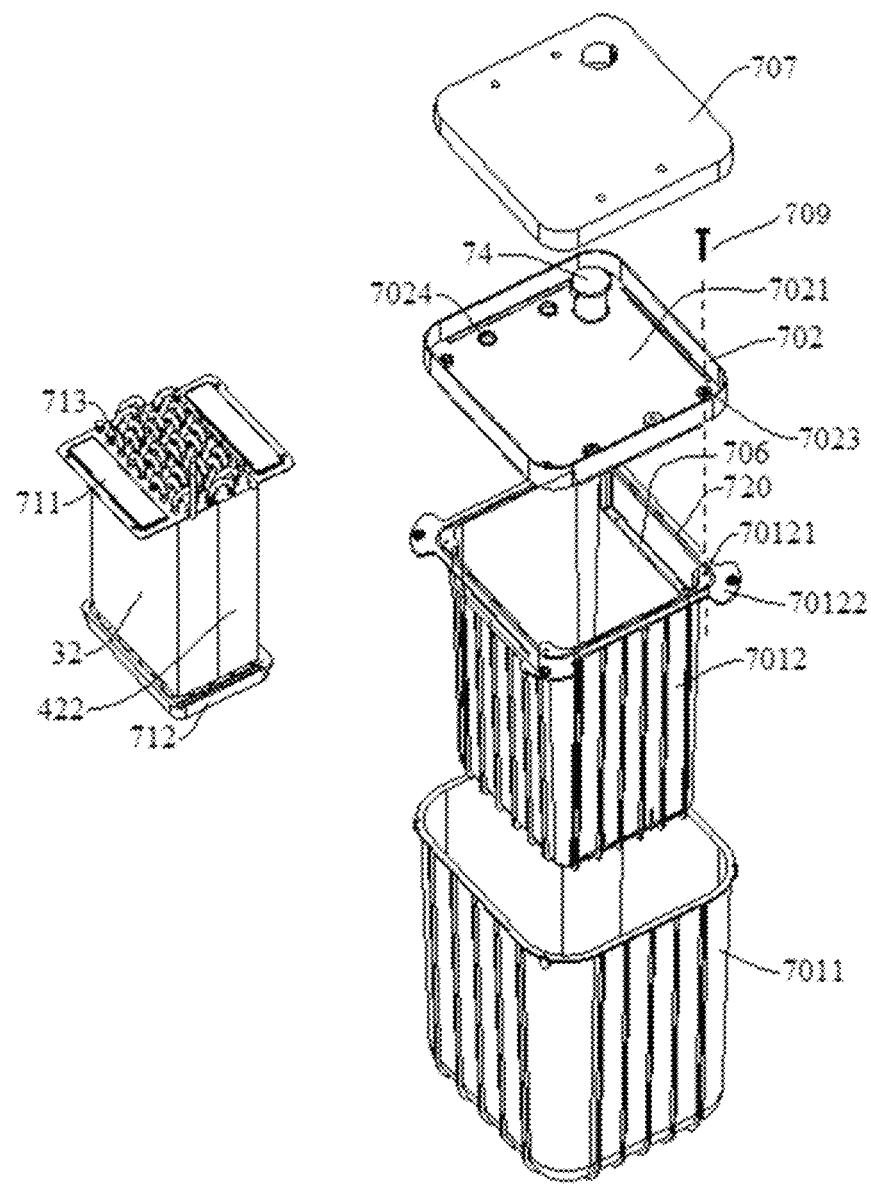
FIG. 24 is a schematic exploded view of an energy storage device according to an embodiment of the present application.
Figure 25:
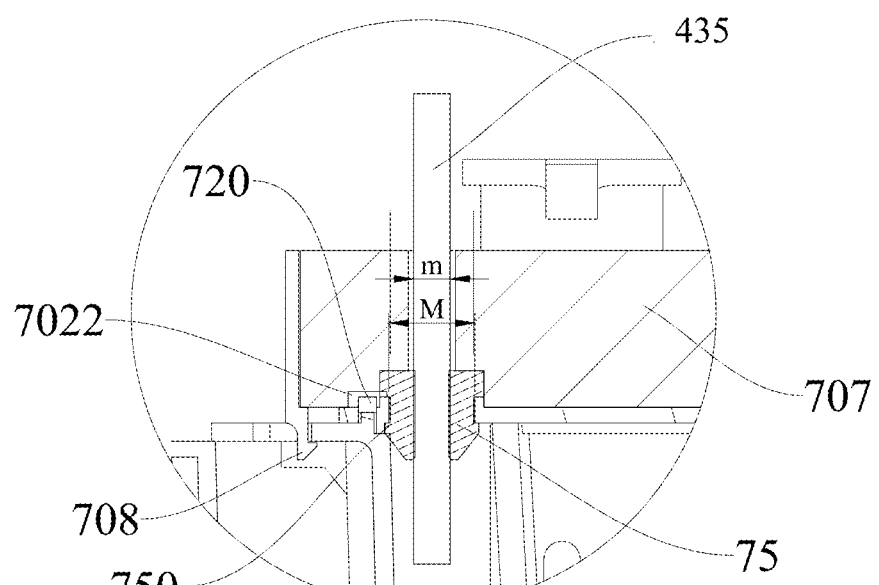
FIG. 25 is an enlarged view of portion C in FIG. 16.

In order to avoid leakage of the energy storage medium in the inner casing 7012 from the storage container 421, and also avoid leakage of the cold from between the top cover 702 and the inner casing 7012, in some embodiments of the present application, as illustrated in FIGS. 16, 24 and 25, the energy storage device 42 also includes a seal ring 720, and the seal ring 720 is provided between the top cover 702 and a top wall of the inner casing 7012. Specifically, a bottom wall of the top cover 702 includes a first placement groove 7022, and at least a part of the seal ring 720 is accommodated in the first placement groove 7022, to facilitate installation of the seal ring 720. In some examples of the present application, the seal ring 720 is placed on the top wall of the inner casing 7012, and the seal ring 720 is completely accommodated in the first placement groove 7022.

Figure 26:
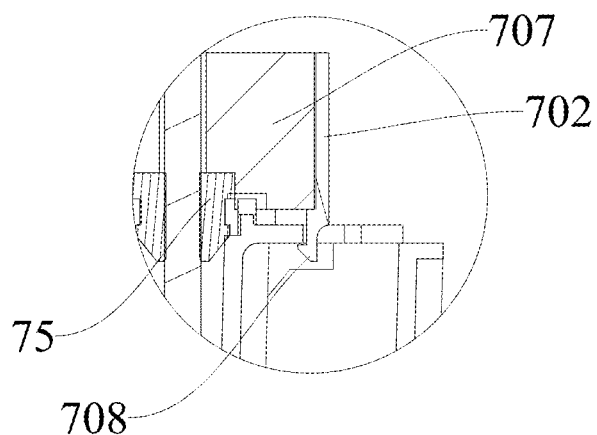
FIG. 26 is an enlarged view of portion D in FIG. 16.

As illustrated in FIGS. 24-26, in some embodiments of the present application, the bottom wall of the top cover 702 includes the first placement groove 7022, at least a part of the seal ring 720 is accommodated in the first placement groove 7022, the top cover 702 is provided with a first snap member 708 and a first fixation hole 7023, the first snap member 708 is snap-fitted with the inner casing 7012, the top wall of the inner casing 7012 includes a second fixation hole 70121 facing the first fixation hole 7023, and a fixation coupling member 709 passes through the first fixation hole 7023 and is fixed in the second fixation hole 70121. By snap-fitting of the first snap member 708 and the inner casing 7012, positioning installation of the top cover 702 can be convenient; furthermore, the top cover 702 and the inner casing 7012 are coupled by the fixation coupling member 709, to ensure firmness of the fixing of the top cover 702, and ensure that the seal ring 720 will not fall off. In some examples of the present application, as illustrated in FIG. 26, the first snap member 708 is a snap hook. Optionally, the fixation coupling member 709 may be a screw.

In some specific embodiments of the present application, a plurality of first snap members 708 are provided, and a plurality of first snap members 708 are spaced apart in a circumferential direction of the seal ring 720, and each first snap member 708 is snap-fitted with the inner casing 7012. Thus, the seal ring 720 can be pressed tightly and evenly in the circumferential direction, to further avoid liquid leakage. Optionally, four first snap members 708 may be provided. In some specific embodiments of the present application, a plurality of first fixation holes 7023 may be provided, a plurality of second fixation holes 70121 may be provided, and the plurality of first fixation holes 7023 and the plurality of second fixation holes 70121 are arranged in one-to-one correspondence. Thus, the firmness of the fixing of the top cover 702 can be improved, and meanwhile the seal ring 720 can be pressed tightly and evenly in the circumferential direction, to further avoid liquid leakage. In some examples of the present application, four first snap members 708 are provided, and four first fixation holes 7023 are provided.

In some embodiments of the present application, as illustrated in FIGS. 15, 16, and 23-24, the top cover 702 includes a plurality of avoidance holes 7024, and the inlet tube 7101, the outlet tube 7102, the liquid reception tube 435 and the liquid outlet tube 434 extend out of the storage container 421 through the avoidance holes 7024, respectively. Thus, the energy storage device 42 may be coupled to other components in the air conditioner conveniently. It should be noted that, when the top cover 702 is provided with the top insulation layer 707, the top insulation layer 707 includes avoidance passages in communication with the avoidance holes 7024.

Specifically, in order to avoid leakage of the energy storage medium, the energy storage device 42 also includes waterproof seal members 75, and the waterproof seal members 75 are provided between the inlet tube 7101 and an inner wall of the avoidance hole 7024, between the outlet tube 7102 and the inner wall of the avoidance hole 7024, between the liquid reception tube 435 and the inner wall of the avoidance hole 7024, and between the liquid outlet tube 434 and the inner wall of the avoidance hole 7024, respectively. Optionally, the material of the waterproof seal member 75 may be rubber with Rockwell hardness below 45.

Specifically, the waterproof seal member 75 is in interference fit with the avoidance hole 7024, the waterproof seal member 75 is in interference fit with the inlet tube 7101, the waterproof seal member 75 is in interference fit with the outlet tube 7102, the waterproof seal member 75 is in interference fit with the liquid reception tube 435, and the waterproof seal member 75 is in interference fit with the liquid outlet tube 434. As illustrated in FIG. 25, an inner diameter of the waterproof seal member 75 is m, an outer diameter of the waterproof seal member 75 is M, a diameter of the avoidance hole 7024 is D1, a diameter of the inlet tube 7101, the outlet tube 7102, the liquid reception tube 435 and the liquid outlet tube 434 may be D2, and M>D1, m<D2, value range of a difference between M and D1 and a difference between m and D2 may be 0.3 mm-1 mm, to ensure interference fit effect.

In some embodiments of the present application, the waterproof seal member 75 is provided with an annular separation prevention protrusion 750, and at least a part of the separation prevention protrusion 750 is provided between the top cover 702 and the inner casing 7012. Thus, upper and lower limits on the waterproof seal member 75 can be realized, to prevent the waterproof seal member 75 from falling off.

In some embodiments of the present application, as illustrated in FIG. 25, an outer circumferential wall of the waterproof seal member 75 includes an annular groove, and a part of the top cover 702 surrounding the avoidance hole 7024 extends into the groove, to promote firmness of fixing of the waterproof seal member 75.

In some embodiments of the present application, as illustrated in FIGS. 15-16, the top cover 702 is provided with a liquid filling tube 74 in communication with the inner casing 7012. Thus, the energy storage medium can be added into the inner casing 7012 conveniently.

As illustrated in FIGS. 1, 15-16, and 23-26, the air conditioner 100 according to embodiments of the present application includes a housing 1, a ventilation device (not illustrated), a first heat exchanger 31, a compressor 33, an energy storage device 42, a third heat exchanger 41 and a liquid pump device 43. The housing 1 includes an air inlet, an air outlet, and an air passage communicating the air inlet with the air outlet. The ventilation device is provided in the housing 1, and configured to render the air passage to suck in airflow from the air inlet, and discharge the airflow from the air outlet. Specifically, the air conditioner 100 may be a portable air conditioner.

The energy storage device 42 is an energy storage device 42 according to the above embodiments of the present application, and the compressor 33 is coupled between the first heat exchanger 31 and the second heat exchanger 32. It could be understood that, a throttle element 34 is also provided between the first heat exchanger 31 and the second heat exchanger 32. Refrigerant flow path formed among the compressor 33, the first heat exchanger 31, the second heat exchanger 32 and the throttle element 34 is a compressor system. The compressor system may be used for cooling or heating. When the compressor system has cooling and heating functions at the same time, the compressor system further includes a four-way valve. It should be noted that, when the compressor system performs cooling or heating, the cooling principle and heating principle are existing technologies, and will not be elaborated herein.

The liquid pump device 43 is coupled between the third heat exchanger 41 and the fourth heat exchanger 422 to circulate the coolant between the third heat exchanger 41 and the fourth heat exchanger 422, and the third heat exchanger 41 is provided in the air passage.

Specifically, the containing chamber 703 of the storage container 421 contains energy storage medium, the storage container 421 is also internally provided with the fourth heat exchanger 422, the fourth heat exchanger 422 and the second heat exchanger 32 are separately provided in the energy storage medium, and the second heat exchanger 32 cools or heats the energy storage medium.

A liquid pump system is formed among the fourth heat exchanger 422, the third heat exchanger 41 and the liquid pump device 43, the liquid pump device 43 is coupled to the fourth heat exchanger 422, and the third heat exchanger 41 is coupled to the fourth heat exchanger 422. Under the liquid pump device 43, the coolant is circulated between the fourth heat exchanger 422 and the third heat exchanger 41. The coolant flows through the fourth heat exchanger 422 to be cooled or heated by heat exchange with the energy storage medium, the cooled or heated coolant flows to the third heat exchanger 41 under the action of the liquid pump device 43, and the third heat exchanger 41 discharges the energy of the coolant to the indoor environment through the air passage, to realize temperature adjustment of the indoor environment.

In the air conditioner 100 according to embodiments of the present application, the energy is stored by utilizing energy storage principle, and then the third heat exchanger 41 is used to discharge the energy; when the third heat exchanger 41 is used to discharge cold to the environment, no heat discharge to the environment may be accompanied, thus it is not necessary to provide an exhaust tube, etc., use environment of the air conditioner 100 will not be limited, and use range of the air conditioner can be expanded. Meanwhile, the thermal insulation effect of the storage container 421 is good, and cooling/heating and energy storage effect of the energy storage device 42 is ensured.

In the description of the present application, it is to be understood that terms such as "central," "longitudinal," "lateral," "length," "width," "thickness," "upper," "lower," "front," "rear," "left," "right," "vertical," "horizontal," "top," "bottom," "inner," "outer," "axial," "radial," and "circumferential" should be construed to refer to the orientation as then described or as shown in the drawings under discussion. These relative terms are for convenience of description of the present application and simplification of the description, and do not indicate or suggest that the device or element referred to must have a particular orientation, and be constructed or operated in a particular orientation. In addition, the feature associated with "first" and "second" may explicitly or implicitly comprise one or more of this feature. In the description of the present disclosure, the term "a plurality of" means two or more than two, unless specified otherwise.

In the description of the present application, unless specified or limited otherwise, the terms "installed," "connected," "coupled," and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "schematic embodiment", "an example," "a specific example," or "some examples," means that a particular feature, structure, material, or characteristic described in connection with the embodiment or example is included in at least one embodiment or example of the present application. Thus, the schematic representations of the above phrases in this specification are not necessarily referring to the same embodiment or example. Furthermore, the particular features, structures, materials, or characteristics may be combined in any suitable manner in one or more embodiments or examples.

Although embodiments of the present application have been shown and described, it would be appreciated by those skilled in the art that changes, modifications, alternatives, and variations can be made in those embodiments without departing from principles and purposes of the present disclosure. The scope of the present application is defined by the claims and their equivalents.

What is claimed is:

1. An air conditioner comprising:
a housing;
a compressor system provided in the housing and including a first heat exchanger, a second heat exchanger, a compressor, and a throttle device that are circularly communicated; and
a liquid pump system provided in the housing and including a third heat exchanger, an energy storage device, and a liquid pump device that are circularly communicated;
wherein:
the liquid pump system contains a coolant circulating in the liquid pump system;
the energy storage device includes an energy storage medium configured to receive energy from the second heat exchanger and store the energy, and to exchange heat with the coolant, the coolant including an alcohol solution having a freezing point lower than a cold storage temperature of the energy storage medium;
the energy storage device further includes:
a storage container containing the energy storage medium, the second heat exchanger being provided in the energy storage medium; and
a fourth heat exchanger provided in the energy storage medium and configured to receive energy from the energy storage medium;
the liquid pump device is coupled between the third heat exchanger and the fourth heat exchanger, to circulate the coolant between the third heat exchanger and the fourth heat exchanger;
a containing chamber is provided inside the storage container, the containing chamber containing the energy storage medium; and
the energy storage device further includes:
an upper member provided at upper portions of the second heat exchanger and the fourth heat exchanger, the upper member being fixed at the storage container; and
a lower member fixed at lower portions of the second heat exchanger and the fourth heat exchanger, the lower member being positioned at a bottom wall of the containing chamber.

2. The air conditioner according to claim 1, wherein:
an upper accommodation space and a lower accommodation space are provided in the housing;
at least one of the first heat exchanger or the third heat exchanger is located in the upper accommodation space; and
at least one of the second heat exchanger or the energy storage device is located in the lower accommodation space.

3. The air conditioner according to claim 2, wherein:
an intermediate accommodation space is provided in the housing and located between the upper accommodation space and the lower accommodation space; and
at least one of the compressor or the liquid pump device is located in the intermediate accommodation space.

4. The air conditioner according to claim 1, further comprising:
a ventilation device;
wherein:
an air passage is provided in the housing;
the third heat exchanger is provided in the air passage; and
the ventilation device is configured to ventilate the air passage.

5. The air conditioner according to claim 4, further comprising:
a power storage device electrically coupled to at least the liquid pump device and the ventilation device, to provide power to the liquid pump device and the ventilation device.

6. The air conditioner according to claim 4, wherein:
the air passage is a first air passage and the ventilation device is a first ventilation device;
a second air passage is provided in the housing; and
the first heat exchanger is provided in the second air passage;
the air conditioner further comprising:
a second ventilation device configured to ventilate the second air passage.

7. The air conditioner according to claim 1, wherein:
the upper member is fitted over a refrigerant tube of the heat exchange assembly;
a positioning groove is formed at the bottom wall of the containing chamber; and
the lower member is inserted in the positioning groove.

8. The air conditioner according to claim 7, wherein:
a group of opposite side walls of the positioning groove extend obliquely downwards towards each other to form first guide faces;
a group of opposite side walls of the lower member extend obliquely downwards towards each other to form second guide faces; and
the first guide faces are fitted with the second guide faces in one-to-one correspondence.

9. The air conditioner according to claim 7, wherein:
an inner wall of the containing chamber is provided with a fixation protrusion; and
the upper member is fixed at an upper surface of the fixation protrusion.

10. The air conditioner according to claim 1, wherein:
each of the second heat exchanger and the fourth heat exchanger is provided with a refrigerant tube; and
the lower member is provided with sleeve members fitted over and in contact with the refrigerant tubes to position the lower member at the second heat exchanger and the fourth heat exchanger.

11. The air conditioner according to claim 1, wherein the storage container includes:
a casing including:
an outer casing having an open top;
an inner casing having an open top and provided in the outer casing, the containing chamber being provided in the inner casing; and
a circumferential wall insulation layer provided between the inner casing and the outer casing; and
a top cover provided on the casing to close the containing chamber.

12. The air conditioner according to claim 11, wherein the top cover is provided with a top insulation layer.

13. The air conditioner according to claim 11, further comprising:
a seal ring between the top cover and a top wall of the inner casing.

14. The air conditioner according to claim 13, wherein:
a placement groove is formed at a bottom wall of the top cover, at least a part of the seal ring being accommodated in the placement groove;
the top cover is provided with:
a snap member snap-fitted with the inner casing; and
a first fixation hole;
a second fixation hole facing the first fixation hole is formed at the top wall of the inner casing; and
a fixation coupling member passes through the first fixation hole and is fixed in the second fixation hole.

15. The air conditioner according to claim 14, wherein the first snap member is one of a plurality of first snap members spaced apart in a circumferential direction of the seal ring and snap-fitted with the inner casing.

16. The air conditioner according to claim 11, wherein:
the second heat exchanger includes an inlet tube and an outlet tube;
the fourth heat exchanger includes a liquid reception tube and a liquid outlet tube;
a plurality of avoidance holes are formed at the top cover; and
the inlet tube, the outlet tube, the liquid reception tube, and the liquid outlet tube extend out of the storage container through a first avoidance hole, a second avoidance hole, a third avoidance hole, and a fourth avoidance hole, respectively, of the plurality of avoidance holes.

17. The air conditioner according to claim 16, further comprising:
waterproof members provided between the inlet tube and an inner wall of the first avoidance hole, between the outlet tube and an inner wall of the second avoidance hole, between the liquid reception tube and an inner wall of the third avoidance hole, and between the liquid outlet tube and an inner wall of the fourth avoidance hole, respectively.

18. The air conditioner according to claim 17, wherein each of the waterproof members is provided with an annular separation prevention protrusion, and at least a part of the separation prevention protrusion is provided between the top cover and the inner casing.

* * * * *